United States Patent
Cheng et al.

(10) Patent No.: US 11,234,285 B2
(45) Date of Patent: Jan. 25, 2022

(54) EV2X MOBILITY SUPPORT FOR MODE 3.5/RSU SCHEDULED MODE

(71) Applicant: QUALCOMM Incorporated, San Diego, CA (US)

(72) Inventors: Hong Cheng, Bridgewater, NJ (US); Arjun Bharadwaj, Cupertino, CA (US); Sudhir Kumar Baghel, Hillsborough, NJ (US); Kapil Gulati, Hillsborough, NJ (US); Zhibin Wu, Sunnyvale, CA (US); Junyi Li, Chester, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/673,886

(22) Filed: Nov. 4, 2019

(65) Prior Publication Data

US 2020/0154501 A1 May 14, 2020

Related U.S. Application Data

(60) Provisional application No. 62/760,148, filed on Nov. 13, 2018.

(51) Int. Cl.
*H04W 76/23* (2018.01)
*H04W 36/00* (2009.01)
(Continued)

(52) U.S. Cl.
CPC ............ *H04W 76/23* (2018.02); *H04W 4/40* (2018.02); *H04W 36/03* (2018.08); *H04W 92/10* (2013.01); *H04W 92/18* (2013.01)

(58) Field of Classification Search
CPC ....... H04W 76/23; H04W 36/03; H04W 4/40; H04W 92/10; H04W 92/18; H04W 76/27;
(Continued)

(56) References Cited

U.S. PATENT DOCUMENTS 10,849,031 B2 * 11/2020 Byun ................... H04W 36/14
11,057,753 B2 * 7/2021 Byun ................... H04W 76/23
(Continued)

FOREIGN PATENT DOCUMENTS

EP 3041286 A1 7/2016
EP 3273634 A1 1/2018
(Continued)

OTHER PUBLICATIONS

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, 3rd Generation Partnership Project (3GPP), Mobile Competence Centre ; 650, Route Des Lucioles; F-06921 Sophia-Antipolis Cedex; France, vol. RAN WG2, No. V15.1.0, Apr. 2, 2018 (Apr. 2, 2018), pp. 1-71, XP051450731, [retrieved on Apr. 2, 2018], paragraph [9.2.2.4].

(Continued)

*Primary Examiner* — Afshawn M Towfighi
(74) *Attorney, Agent, or Firm* — Danai Nelisile Mhembere; Holland & Hart LLP

(57) ABSTRACT

Methods, systems, and devices for wireless communications are described. The method, system, and apparatus may include managing the operation mode of a user equipment in vehicle-to-everything communication. In some aspects, a user equipment may transmit an inactive request message (or a request message) to a base station to indicate the user equipment is switching from a base station scheduling mode (or a radio access network node scheduling mode) to a peer
(Continued)

user equipment scheduling mode (or a roadside unit scheduling mode). The user equipment may receive an acknowledgment message from the base station indicating a state change to allow the peer user equipment scheduling mode. In some cases, the user equipment may receive an area identifier from the base station, and the area identifier may indicate an area where the peer user equipment scheduling mode is allowed.

30 Claims, 12 Drawing Sheets

(51) Int. Cl.
    *H04W 4/40* (2018.01)
    *H04W 92/10* (2009.01)
    *H04W 92/18* (2009.01)

(58) Field of Classification Search
    CPC ....... H04W 16/14; H04W 4/70; H04W 76/14; H04W 72/02; H04W 76/20; H04W 36/36; H04W 36/30; H04W 28/0875; H04W 28/08
    See application file for complete search history.

(56) References Cited

U.S. PATENT DOCUMENTS

| | | | |
|---|---|---|---|
| 2015/0223279 A1* | 8/2015 | Jiao | H04W 4/06 370/312 |
| 2018/0279095 A1* | 9/2018 | Xu | H04W 4/40 |
| 2018/0324842 A1 | 11/2018 | Gulati et al. | |
| 2019/0045405 A1* | 2/2019 | Byun | H04W 36/24 |
| 2019/0335532 A1* | 10/2019 | Kim | H04W 4/90 |
| 2020/0137538 A1* | 4/2020 | Chen | H04W 76/14 |

FOREIGN PATENT DOCUMENTS

| | | |
|---|---|---|
| EP | 3439394 A1 | 2/2019 |
| EP | 3454617 A1 | 3/2019 |
| EP | 3562182 A1 | 10/2019 |
| WO | WO-2017167287 A1 | 10/2017 |
| WO | WO-2017190662 A1 | 11/2017 |
| WO | WO-2018129875 A1 | 7/2018 |

OTHER PUBLICATIONS

International Search Report and Written Opinion—PCT/US2019/059902—ISA/EPO—dated Feb. 28, 2020.

* cited by examiner

EV2X MOBILITY SUPPORT FOR MODE 3.5/RSU SCHEDULED MODE

CROSS REFERENCE

The present Application for Patent claims the benefit of U.S. Provisional Patent Application No. 62/760,148 by Cheng et al., entitled "eV2X MOBILITY SUPPORT FOR MODE 3.5/RSU SCHEDULED MODE," filed Nov. 13, 2018, assigned to the assignee hereof, and expressly incorporated by reference herein in its entirety.

BACKGROUND

The following relates generally to a method and apparatus for managing the operation mode of a user equipment (UE) for vehicle-to-everything (V2X) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency-division multiple access (OFDMA) systems. A wireless multiple-access communications system may include a number of base stations, each simultaneously supporting communication for multiple communication devices, which may be otherwise known as UEs.

SUMMARY

The present disclosure relates to methods, systems, devices, and apparatuses that support a roadside unit (RSU) scheduling mode for sidelink communications (e.g., mode 3.5). Managing the operation mode of a first user equipment (UE) in vehicle-to-everything (V2X) communication are described, which may include the first UE sending an inactive request message (e.g., a PC5 inactive request message) to a base station to indicate the UE is switching from a base station scheduling mode (e.g., a radio access network (RAN) node scheduling mode) to a peer UE scheduling mode (e.g., the RSU scheduling mode), the first UE receives an acknowledgment message from the base station indicating a state change to allow the peer UE scheduling mode. In some aspects, the first UE receives an area identifier (ID) from the base station, the area ID indicating an area in which the peer UE scheduling mode is allowed.

A method of managing an operation mode of a first UE in device-to-device communication is described. The method may include transmitting, by the first UE, a request message to a base station to indicate the first UE is switching from a base station scheduling mode to a peer UE scheduling mode and receiving, by the first UE, an acknowledgment message from the base station indicating a state change to allow the peer UE scheduling mode.

An apparatus for managing an operation mode of a first UE in device-to-device communication is described. The apparatus may include a processor and memory coupled with the processor. The processor may be configured to transmit a request message to a base station to indicate the first UE is switching from a base station scheduling mode to a peer UE scheduling mode and receive an acknowledgment message from the base station indicating a state change to allow the peer UE scheduling mode.

Another apparatus for managing an operation mode of a first UE in device-to-device communication is described. The apparatus may include means for transmitting a request message to a base station to indicate the first UE is switching from a base station scheduling mode to a peer UE scheduling mode and receiving an acknowledgment message from the base station indicating a state change to allow the peer UE scheduling mode.

A non-transitory computer-readable medium storing code for managing an operation mode of a first UE in device-to-device communication is described. The code may include instructions executable by a processor to transmit a request message to a base station to indicate the first UE is switching from a base station scheduling mode to a peer UE scheduling mode and receive an acknowledgment message from the base station indicating a state change to allow the peer UE scheduling mode.

In some aspects of the method, apparatuses, and non-transitory computer-readable medium described herein, the peer UE scheduling mode may include a second UE allocating resources for the device-to-device communication for the first UE, where the resources may be allocated using a direct communication interface between the first UE and the second UE, a sidelink interface between the first UE and the second UE, or any combination thereof.

Some aspects of the method, apparatuses, and non-transitory computer-readable medium described herein may include operations, features, means, or instructions for performing, by the first UE, a handover from the second UE to a third UE to continue the peer UE scheduling mode.

In some aspects of the method, apparatuses, and non-transitory computer-readable medium described herein, the handover may include sending, by the first UE, another request message to the base station including an identifier of the third UE to the base station. In some aspects of the method, apparatuses, and non-transitory computer-readable medium described herein, the second UE includes a roadside unit (RSU).

Some aspects of the method, apparatuses, and non-transitory computer-readable medium described herein may include operations, features, means, or instructions for determining, by the first UE, that the first UE may be within an area identified by an area identifier, and transmitting, by the first UE, a resume message to the base station to indicate the first UE may be switching from the peer UE scheduling mode to the base station scheduling mode.

In some aspects of the method, apparatuses, and non-transitory computer-readable medium described herein, the area identifier includes a list of identifiers, among which at least one identifier of the list of identifiers may be announced by a second UE allocating resources for the device-to-device communication for the first UE.

In some aspects of the method, apparatuses, and non-transitory computer-readable medium described herein, the area identifier includes an identifier announced by the base station. In some aspects of the method, apparatuses, and non-transitory computer-readable medium described herein, the resume message includes a resume identifier.

Some aspects of the method, apparatuses, and non-transitory computer-readable medium described herein may include operations, features, means, or instructions for receiving, by the first UE, an area identifier from the base station, the area identifier indicating an area in which the peer UE scheduling mode may be allowed. Some aspects of the method, apparatuses, and non-transitory computer-readable medium described herein may include operations, features, means, or instructions for performing, by the first UE, a handover from the base station to another base station, and maintaining the peer UE scheduling mode.

Some aspects of the method, apparatuses, and non-transitory computer-readable medium described herein may include operations, features, means, or instructions for determining, by the first UE, a priority of device-to-device communication traffic in the peer UE scheduling mode based on an application that may be being handled by the first UE. In some aspects of the method, apparatuses, and non-transitory computer-readable medium described herein, the acknowledgement message includes a resume identifier.

In some aspects of the method, apparatuses, and non-transitory computer-readable medium described herein, the request message may be a radio resource control message or a medium access control message. In some aspects of the method, apparatuses, and non-transitory computer-readable medium described herein, the device-to-device communication includes V2X communication.

A method of managing an operation mode of a first UE in device-to-device communication by a base station is described. The method may include receiving, by the base station, a request message from the first UE to indicate the first UE is switching from a base station scheduling mode to a peer UE scheduling mode, transmitting, by the base station, an acknowledgment message to the first UE indicating a state change to allow the peer UE scheduling mode, and maintaining, by the base station, a connection state of the UE while the UE is in the peer UE scheduling mode.

An apparatus for managing an operation mode of a first UE in device-to-device communication is described. The apparatus may include a processor, memory coupled with the processor, and instructions stored in the memory. The instructions may be executable by the processor to cause the apparatus to receive a request message from the first UE to indicate the first UE is switching from a base station scheduling mode to a peer UE scheduling mode, transmit an acknowledgment message to the first UE indicating a state change to allow the peer UE scheduling mode, and maintain a connection state of the UE while the first UE is in the peer UE scheduling mode.

Another apparatus for managing an operation mode of a first UE in device-to-device communication is described. The apparatus may include means for receiving a request message from the first UE to indicate the first UE is switching from a base station scheduling mode to a peer UE scheduling mode, transmitting an acknowledgment message to the first UE indicating a state change to allow the peer UE scheduling mode, and maintaining a connection state of the first UE while the first UE is in the peer UE scheduling mode.

A non-transitory computer-readable medium storing code for managing an operation mode of a first UE in device-to-device communication is described. The code may include instructions executable by a processor to receive a request message from the first UE to indicate the first UE is switching from a base station scheduling mode to a peer UE scheduling mode, transmit an acknowledgment message to the first UE indicating a state change to allow the peer UE scheduling mode, and maintain a connection state of the first UE while the first UE is in the peer UE scheduling mode.

Some aspects of the method, apparatuses, and non-transitory computer-readable medium described herein may include operations, features, means, or instructions for performing, by the base station, at least one type of authorization of the peer UE scheduling mode based on an identifier for a second UE.

In some aspects of the method, apparatuses, and non-transitory computer-readable medium described herein, performing the at least one type of authorization includes increasing or decreasing, by the base station, resources allocated to the second UE for peer UE scheduling mode operation.

In some aspects of the method, apparatuses, and non-transitory computer-readable medium described herein, the request message includes the identifier for the second UE.

DETAILED DESCRIPTION

Figure 1:
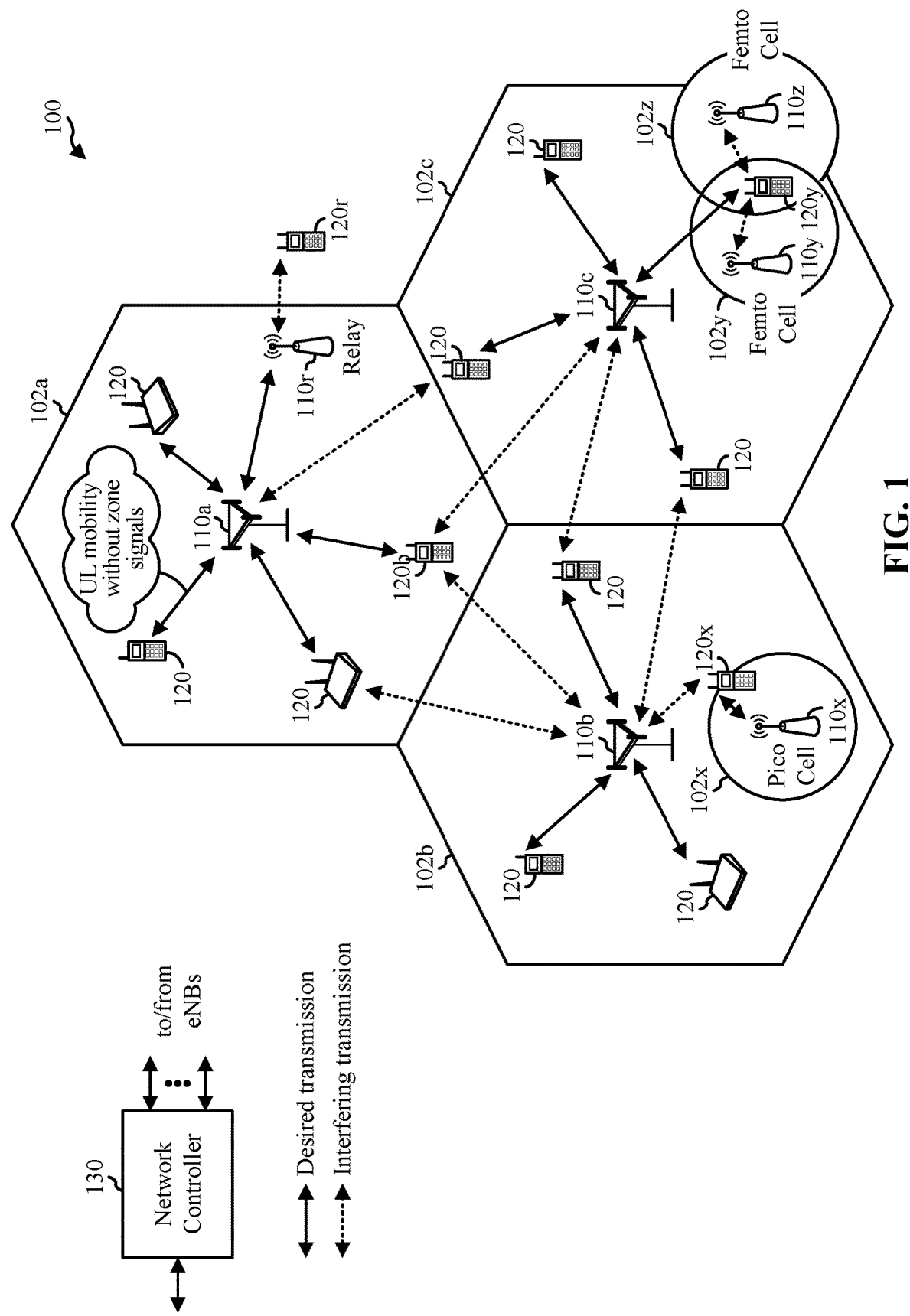
FIG. 1 is a block diagram illustrating an example telecommunications system in accordance with certain aspects of the present disclosure.

Some wireless communications systems may support sidelink communication between user equipment (UEs). Sidelink communication may also be referred to as device-to-device (D2D) communication, peer-to-peer (P2P) communication, vehicle-to-vehicle (V2V) communication, vehicle-to-everything (V2X) communication, or the like. In some aspects (e.g., V2X communications), a UE may communicate with one or more other UEs over a sidelink communications link, and the UE may also communicate with a base station. In some cases, the UE may be provided with resources for the sidelink communications by the base station. Additionally or alternatively, the UE may autonomously select resources for communicating with another UE for sidelink communications.

Sidelink communication may be employed in various wireless communications systems (e.g., Long Term Evolution (LTE) systems, 5G new radio (NR) systems), and may coexist with signaling and waveforms for downlink (e.g., from a base station to a UE), and uplink (e.g., from a UE to a base station) communications. In some wireless communications systems (e.g., 5G NR systems), subcarrier spacing may be scaled. Also, the waveforms selected for communications may include cyclic prefix (CP)-orthogonal frequency-division multiplexing (CP-OFDM) and discrete Fourier transform (DFT)-spread (DFT-s) OFDM. In addition, some systems may allow for switching between CP-OFDM and DFT-s-OFDM on the uplink to obtain multiple-input multiple-output (MIMO) spatial multiplexing benefits of CP-OFDM and link budget benefits of DFT-s-OFDM. In some wireless communications system (e.g., LTE systems, 5G NR systems), OFDMA communications signals may be used for downlink communications, while single-carrier frequency-division multiple access (SC-FDMA) communications signals may be used for uplink communications. The DFT-s-OFDMA scheme spreads a plurality of data symbols (i.e., a data symbol sequence) over a frequency domain, which is different from the OFDMA scheme. In comparison to the OFDMA scheme, the DFT-s-OFDMA scheme may reduce a peak-to-average power ratio (PAPR) of a transmission signal. The DFT-s-OFDMA scheme may also be referred to as an SC-FDMA scheme.

A scalable orthogonal frequency-division multiplexing (OFDM) multi-tone numerology is another feature of, in some aspects, 5G NR systems. Prior versions of LTE supported a mostly fixed OFDM numerology of 15 kHz spacing between OFDM tones (often called subcarriers) and carrier bandwidths up to 20 megahertz (MHz). Scalable OFDM numerology may support diverse spectrum bands/types and deployment models. In one aspect, 5G NR may operate in millimeter wave (mmWave) bands that have wider channel widths (e.g., 100s of MHz) than in use in LTE. Also, the OFDM subcarrier spacing may be scaled with the channel width, and a fast Fourier transform (FFT) size may scale such that processing complexity may not increase unnecessarily for wider bandwidths. In the present application, numerology refers to the different values that different features of a communication system may take, such as subcarrier spacing, cyclic prefix, symbol length, FFT size, transmission time interval (TTI) duration, or the like.

Also in LTE and 5G NR, cellular technologies have been expanded into the unlicensed spectrum, both stand-alone and licensed-assisted (LAA). In addition, the unlicensed spectrum may occupy frequencies up to 60 gigahertz (GHz), also known as mmWave. The used of unlicensed bands provides added capacity.

A first member of this technology family is referred to as LTE Unlicensed or LTE-U. By aggregating LTE in unlicensed spectrum with an "anchor" channel in licensed spectrum, faster downloads are enabled for customers. Also, LTE-U shares the unlicensed spectrum fairly with Wi-Fi. This is an advantage because in the 5 GHz unlicensed band where Wi-Fi devices are in wide use, it is desirable for LTE-U to coexist with the Wi-Fi. However, an LTE-U network may cause radio frequency (RF) interference to an existing co-channel Wi-Fi device. Choosing a preferred operating channel and minimizing the interference caused to nearby Wi-Fi networks is a goal for LTE-U devices. However, the LTE-U single carrier (SC) device may operate on the same channel as Wi-Fi if all available channels are occupied by Wi-Fi devices. To coordinate spectrum access between LTE-U and Wi-Fi, the energy across the intended transmission band is first detected. This energy detection (ED) mechanism informs the device of ongoing transmissions by other nodes. Based on this ED information, a device decides if it should transmit. A Wi-Fi device may not back off to LTE-U unless the Wi-Fi device's interference level is above an energy detection threshold (e.g., −62 dBm over 20 MHz). Thus, without proper coexistence mechanisms in place, LTE-U transmissions may cause considerable interference on a Wi-Fi network relative to Wi-Fi transmissions.

LAA is another member of the unlicensed technology family. Like LTE-U, LAA also uses an anchor channel in licensed spectrum. However, LAA may also add "listen before talk" (LBT) to the LTE functionality.

A gating interval may be used to gain access to a channel of a shared spectrum. The gating interval may determine the application of a contention-based protocol, such as an LBT protocol. The gating interval may indicate when a clear channel assessment (CCA) is performed. Whether a channel of the shared unlicensed spectrum is available or in use may be determined by the CCA. If the channel is "clear" for use, i.e., available, the gating interval may allow the transmitting apparatus to use the channel. Access to the channel may be for a predefined transmission interval. Thus, with unlicensed spectrum, an LBT procedure is performed before transmitting a message. If the channel is not cleared for use, then a device may not transmit.

Another member of this family of unlicensed technologies is LTE-wireless local area network (WLAN) aggregation (LWA), which may utilize both LTE and Wi-Fi. Accounting for both channel conditions, LWA may split a single data flow into two data flows which allows both the LTE and the Wi-Fi channel to be used for an application. Instead of competing with Wi-Fi, the LTE signal may use the WLAN connections seamlessly to increase capacity.

An additional member of this family of unlicensed technologies may include MulteFire. MulteFire opens up new opportunities by operating 4G LTE or 5G NR technology solely in unlicensed spectrum, such as the global 5 GHz band. Unlike LTE-U and LAA, MulteFire allows devices to communicate without any access to licensed spectrum. Thus, MulteFire may operate in unlicensed spectrum on a standalone basis, that is, without an anchor channel in the licensed spectrum. Thus, MulteFire differs from LTE-U, LAA, and LWA because LTE-U, LAA, and LWA may aggregate unlicensed spectrum with an anchor in licensed spectrum. Without relying on licensed spectrum as the anchoring service, MulteFire allows for Wi-Fi like deployments. A MulteFire network may therefore include access points (APs) and/or base stations communicating in an unlicensed radio frequency spectrum band, e.g., without an licensed anchor carrier.

Discovery reference signal (DRS) measurement timing configuration (DMTC) may be a technique that allows MulteFire to transmit with minimal interference to other unlicensed technologies, including Wi-Fi. The periodicity of discovery signals may be sparse, allowing devices that support MulteFire to access channels occasionally, transmit discovery and control signals, and then vacate the channels. Since the unlicensed spectrum is shared with other radios of similar or dissimilar wireless technologies, an LBT method may be applied for channel sensing. LBT involves sensing the medium for a pre-defined minimum amount of time and backing off if the channel is busy. Therefore, an initial random access (RA) procedure for standalone LTE-U may involve as few transmissions as possible and also have low latency, such that the number of LBT operations may be minimized and the RA procedure may then be completed as quickly as possible.

Leveraging a DMTC window, MulteFire algorithms may search and decode reference signals in unlicensed band from neighboring base stations to know which base station would be best for serving the user. For instance, as the user moves past one base station, their UE sends a measurement report to the base station, triggering a handover and transferring the caller (and all of their content and information) to the next base station.

Because LTE traditionally operated in licensed spectrum and Wi-Fi operated in unlicensed bands, coexistence with Wi-Fi or other unlicensed technology was not considered when LTE was designed. In moving to unlicensed RF spectrum, the LTE waveform was modified and algorithms were added to perform LBT. The operation of unlicensed incumbents, including Wi-Fi, may be respected by not just acquiring a channel and immediately transmitting. The present aspects support LBT and the detection and transmission of Wi-Fi channel usage beacon signal (WCUBS) for ensuring coexistence with Wi-Fi neighbors.

MulteFire was designed to "hear" a neighboring Wi-Fi base station's transmission (e.g., due to operation in unlicensed spectrum). MulteFire listens first, and autonomously makes the decision to transfer when there is no other neighboring Wi-Fi transmitting on the same channel. This technique ensures co-existence between MulteFire and Wi-Fi.

Additionally, the unlicensed rules and regulations set by the 3rd Generation Partnership Project (3GPP) and the European Telecommunications Standards Institute (ETSI), which mandates the −72 dBm LBT detection threshold, may be adhered to for LBT procedures, which may further avoid conflict with Wi-Fi communications. MulteFire's LBT design is identical to the standards defined in 3GPP for LAA/enhanced LAA (eLAA) and complies with ETSI rules.

An expanded functionality for 5G involves the use of 5G NR spectrum sharing, or NR-SS. 5G spectrum sharing enables enhancement, expansion, and upgrade of the spectrum sharing technologies introduced in LTE. These include LWA, LAA, eLAA, and Citizens Broadband Radio Service (CBRS)/License Shared Access (LSA).

Aspects of the disclosure are initially described in the context of a wireless communication system. Aspects of the disclosure are then illustrated by and described with reference to apparatus diagrams, system diagrams, and flowcharts that relate to managing the operation mode of UE in vehicle-to-everything (V2X) communication.

FIG. 1 is a block diagram illustrating an example telecommunications system. In one aspect, FIG. 1 illustrates an example wireless network 100, such as an NR or 5G network, in which aspects of the present disclosure may be performed.

As illustrated in FIG. 1, the wireless network 100 may include a number of base stations 110 and other network entities. A base station 110 may be a station that communicates with UEs 120. Each base station 110 may provide communication coverage for a particular geographic area. The term "cell" may refer to a coverage area of a Node B and/or a Node B subsystem serving this coverage area, depending on the context in which the term is used. The term "cell" and eNB, Node B, 5G NodeB (NB), AP, NR base station, NR BS, 5G Radio NodeB (gNB), or transmission reception point (TRP) may be interchangeable. In some aspects, a cell may not be stationary, and the geographic area of the cell may move according to the location of a mobile base station 110. In some aspects, the base stations 110 may be interconnected to one another and/or to one or more other base stations 110 or network nodes (not shown) in the wireless network 100 through various types of backhaul interfaces, such as a direct physical connection, a virtual network, or the like, using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A base station 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG), UEs 120 for users in the home, etc.). A base station 110 for a macro cell may be referred to as a macro base station 110. A base station 110 for a pico cell may be referred to as a pico base station 110. A base station 110 for a femto cell may be referred to as a femto base station 110 or a home base station 110. In the aspects shown in FIG. 1, the base stations 110a, 110b and 110c may be macro base stations 110 for the macro cells 102a, 102b and 102c, respectively. The base station 110x may be a pico base station 110 for a pico cell 102x. The base stations 110y and 110z may be femto base stations 110 for the femto cells 102y and 102z, respectively. A base station 110 may support one or multiple (e.g., three) cells.

The wireless network 100 may also include relay stations. A relay station is a station that receives a transmission of data and/or other information from an upstream station (e.g., a base station 110 or a UE 120) and sends a transmission of the data and/or other information to a downstream station (e.g., a UE 120 or a base station 110). A relay station may also be a UE 120 that relays transmissions for other UEs 120. In the aspects shown in FIG. 1, a relay station 110r may communicate with the base station 110a and a UE 120r to facilitate communication between the base station 110a and the UE 120r. A relay station may also be referred to as a relay base station 110, a relay, etc.

The wireless network 100 may be a heterogeneous network that includes base stations 110 of different types, e.g., macro base station 110, pico base station 110, femto base station 110, relays, etc. These different types of base stations 110 may have different transmit power levels, different coverage areas, and different impact on interference in the wireless network 100. In one aspect, a macro base station 110 may have a high transmit power level (e.g., 20 Watts) whereas a pico base station 110, a femto base station 110, and relays may have a lower transmit power level (e.g., 1 Watt).

The wireless network 100 may support synchronous or asynchronous operation. For synchronous operation, the base stations 110 may have similar frame timing, and transmissions from different base stations 110 may be approximately aligned in time. For asynchronous operation, the base stations 110 may have different frame timing, and transmissions from different base stations 110 may not be aligned in time. The techniques described herein may be used for both synchronous and asynchronous operation.

A network controller 130 may be coupled to a set of base stations 110 and provide coordination and control for these base stations 110. The network controller 130 may communicate with the base stations 110 via a backhaul. The base stations 110 may also communicate with one another, e.g., directly or indirectly via wireless or wireline backhaul.

The UEs 120 (e.g., 120x, 120y, etc.) may be dispersed throughout the wireless network 100, and each UE 120 may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., global positioning system (GPS), BeiDou Navigation Satellite System (BDS), terrestrial), or any other suitable device that is configured to communicate via a wireless or wired medium.

Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that do not necessarily need human interaction. In one aspect, MTC UEs 120 may include UEs 120 that are capable of communications with MTC servers and/or other MTC devices through public land mobile networks (PLMNs). MTC and eMTC UEs 120 include, in some aspects, robots, drones, remote devices, sensors, meters, monitors, cameras, location tags, etc., that may communicate with a base station 110, another device (e.g., remote device), or some other entity. A wireless node may provide, in one aspect, connectivity for or to a network (e.g., a wide area network such as Internet or a cellular network) via a wired or wireless communication link. MTC UEs 120, as well as other UEs 120, may be implemented as Internet-of-Things (IoT) devices, e.g., narrowband IoT (NB-IoT) devices. In NB-IoT, the UL and DL have higher periodicities and repetitions interval values as a UE 120 decodes data in extended coverage.

In FIG. 1, a solid line with double arrows indicates desired transmissions between a UE 120 and a serving base station 110, which is a base station 110 designated to serve the UE 120 on the downlink and/or uplink. A dashed line with double arrows indicates interfering transmissions between a UE 120 and a base station 110.

Certain wireless networks (e.g., LTE) utilize OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. In one aspect, the spacing of the subcarriers may be 15 kHz and the minimum resource allocation (called a "resource block") may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into sub-bands. In one aspect, a sub-band may cover 1.08 MHz (e.g., 6 resource blocks), and there may be 1, 2, 4, 8 or 16 sub-bands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam directions may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based. NR networks may include entities such as central units (CUs) and/or distributed units (DUs).

In some aspects, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. base stations 110 may not be the sole entities that may function as a scheduling entity. That is, in some aspects, a UE 120 may function as a scheduling entity, scheduling resources for one or more subordinate entities (e.g., one or more other UEs). In this aspect, the UE 120 is functioning as a scheduling entity, and other UEs 120 utilize resources scheduled by the UE 120 for wireless communication. A UE 120 may function as a scheduling entity in a peer-to-peer (P2P) network, and/or in a mesh network. In a mesh network, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. An NR base station 110 (e.g., eNB, 5G Node B, Node B, TRP, AP, or gNB) may correspond to one or multiple base stations 110. NR cells may be configured as access cell (ACells) or data only cells (DCells). In one aspect, the RAN (e.g., a CU or DU) may configure the cells. DCells may be cells used for carrier aggregation or dual connectivity, but not used for initial access, cell selection/reselection, or handover. In some cases, DCells may not transmit synchronization signals (SSs)—in other case cases DCells may transmit SSs. NR base stations 110 may transmit downlink signals to UEs indicating the cell type. Based on the cell type indication, the UE may communicate with the NR base station 110. In one aspect, the UE 120 may determine NR base stations 110 to consider for cell selection, access, handover, and/or measurement based on the indicated cell type.

As described herein, the wireless communication network of FIG. 1 may support signaling between a UE 120 and a base station 110 when the UE 120 is switching between scheduling nodes (e.g., between a base station scheduling mode and a peer UE scheduling mode). Such signaling may include the exchange of an inactive request message (e.g., a PC5 inactive request message) and an inactive acknowledgment message (e.g., a PC5 inactive acknowledgment). The signaling may further include the exchange of a resume message (e.g., a PC5 resume message) and a resume acknowledgment message (e.g., a PC5 resume acknowledgement message). In some aspects, the UE 120 may be provided with a resume ID when moving to the peer UE scheduling mode, and may include the resume ID in the signaling used when switching back to a base station scheduling mode. The UE 120 may communicate with a different UE 120 (such as an RSU) that may schedule sidelink resources for the UE 120 after switching to the peer UE scheduling mode. In such cases, the base station 110 may ensure that the UE 120 remains connected to the network while the UE 120 is in the peer UE scheduling mode, which may prevent unnecessary delays should the UE 120 communicate with the base station 110 (e.g., concurrently with sidelink communications while in the peer UE scheduling mode or after switching back to a base station scheduling mode).

Figure 2:
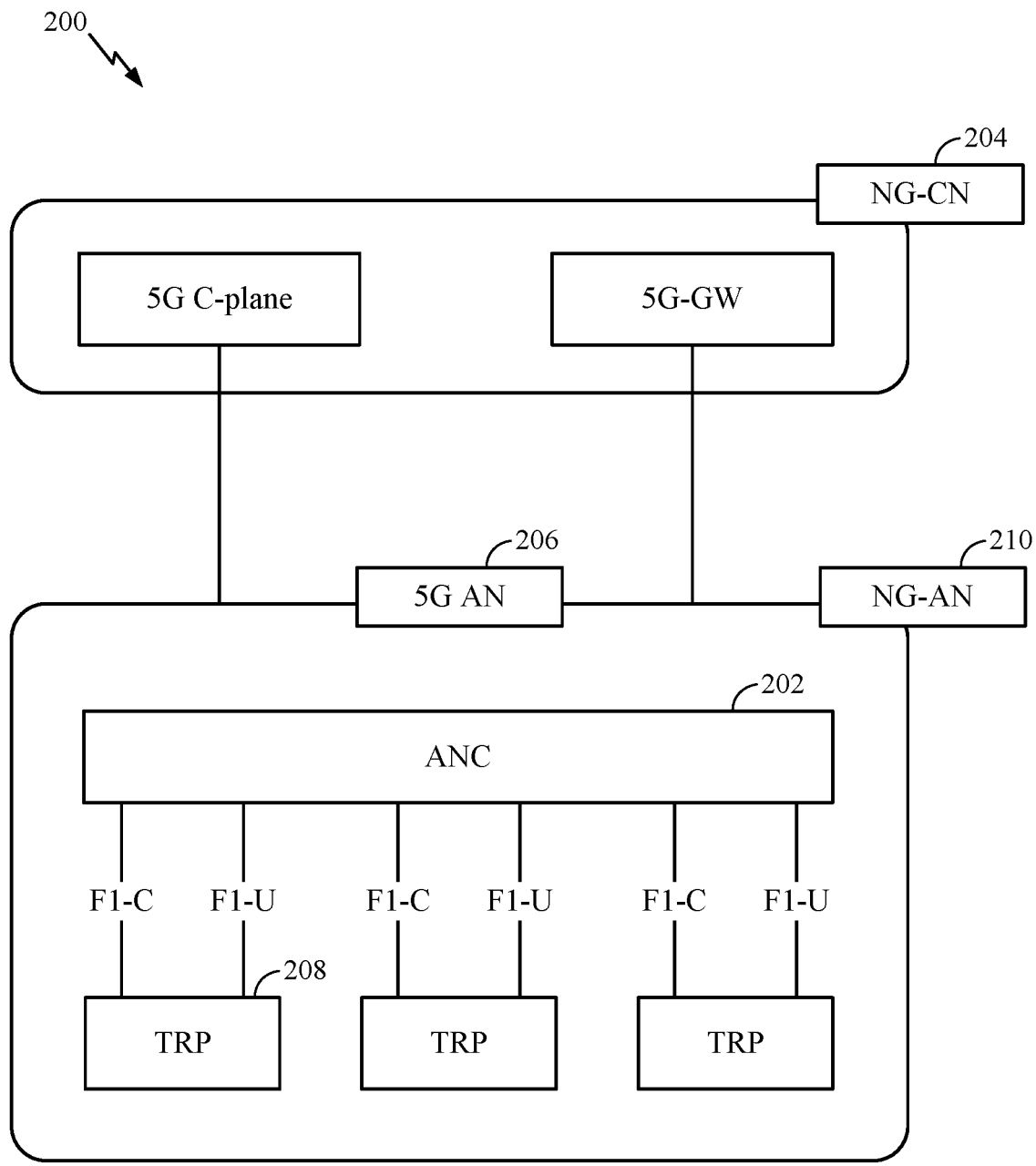
FIG. 2 is a block diagram illustrating an example logical architecture of a distributed radio access network (RAN) in accordance with certain aspects of the present disclosure.

FIG. 2 illustrates an example logical architecture of a distributed RAN 200, in accordance with certain aspects of the present disclosure. The distributed RAN 200 may be implemented in the wireless communication system illustrated in FIG. 1. A 5G access node 206 may include an access node controller (ANC) 202. The ANC may be a CU of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as base stations 110, NR base stations 110, Node Bs, 5G NBs, APs, eNB, gNB, or some other term). As described herein, a TRP may be used interchangeably with "cell."

The TRPs 208 may be a DU. The TRPs 208 may be connected to one ANC 202 or more than one ANC 202 (not illustrated). In some aspects, for RAN sharing, radio as a service (RaaS), and service specific ANC deployments, the TRP 208 may be connected to more than one ANC 202. A TRP 208 may include one or more antenna ports. The TRPs 208 may be configured to individually (e.g., dynamic selection) or jointly (e.g., joint transmission) serve traffic to a UE.

The local architecture of the distributed RAN 200 may be used to illustrate fronthaul definition. The architecture may support fronthauling solutions across different deployment types. In one aspect, the architecture may be based on transmit network capabilities (e.g., bandwidth, latency, and/or jitter).

The architecture may share features and/or components with LTE. According to aspects, the NG-AN 210 may support dual connectivity with NR. The NG-AN may share a common fronthaul for LTE and NR. The architecture may enable cooperation between and among TRPs 208. In one aspect, cooperation may be preset within a TRP 208 and/or across TRPs 208 via the ANC 202. According to aspects, no inter-TRP interface may be needed/present.

According to aspects, a dynamic configuration of split logical functions may be present within the architecture of the distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP 208 or ANC 202, respectively). According to some aspects, a base station 110 may include a CU (e.g., ANC 202) and/or one or more DUs (e.g., one or more TRPs 208). In some cases, the TRPs 208 and/or ANC 202 (or the DUs and/or CUs) may perform aspects of the functions of a base station, a gNB, or similar device, as described herein. In some aspects, the TRPs 208 and ANC 202 described with reference to FIG. 2 may perform aspects of the functions for receiving an inactive request from a UE, transmitting an inactive acknowledgment to the UE, receiving a resume message from the UE, and transmitting a resume acknowledgment message to the UE.

Figure 3:
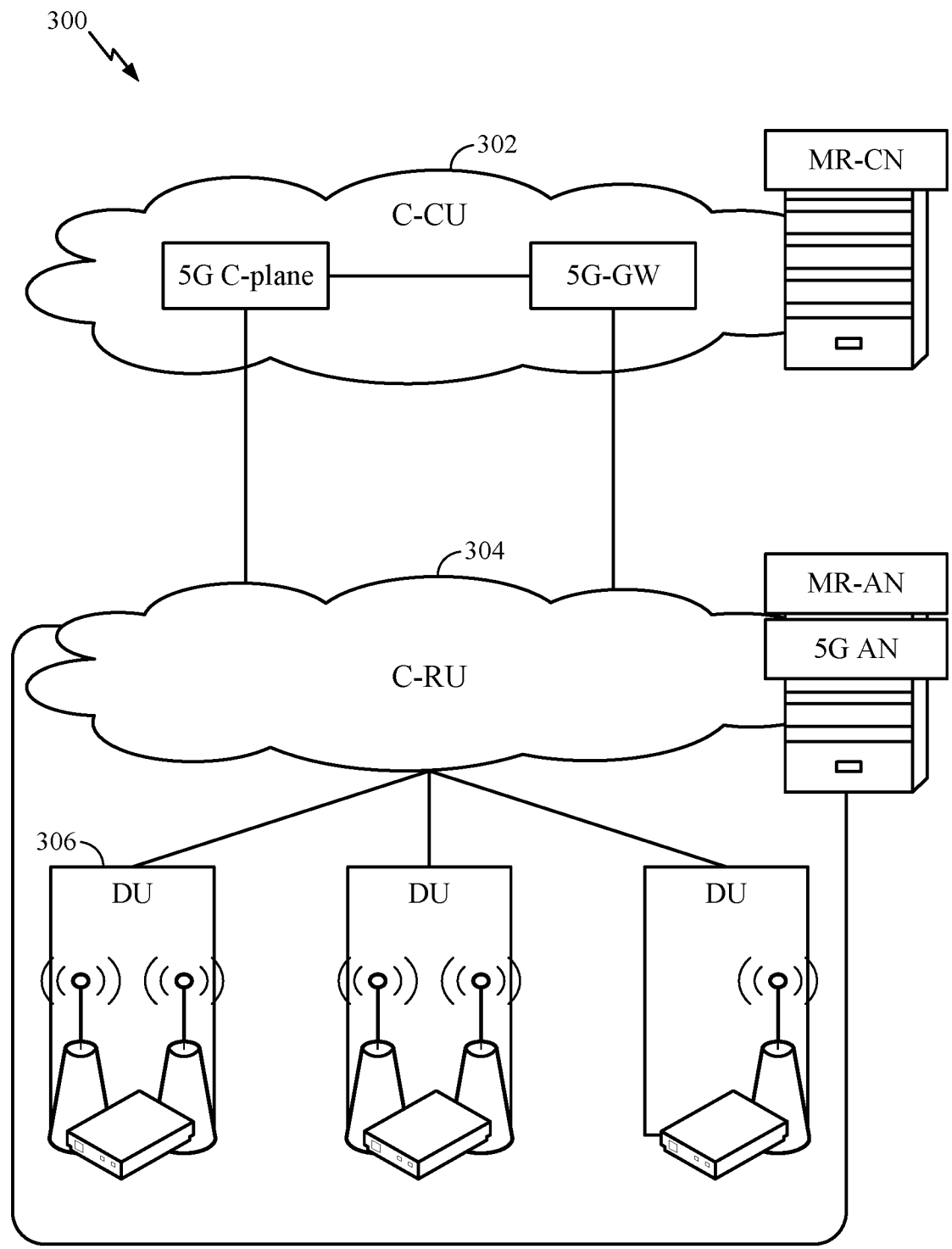
FIG. 3 is a diagram illustrating an example physical architecture of a distributed RAN in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (an edge node (EN), an edge unit (EU), a radio head (RH), a smart radio head (SRH), or the like). The DU may be located at edges of the network with radio frequency (RF) functionality. Additionally, the DUs and/or CUs may perform aspects of the functions of a base station, a gNB, or similar device, as described herein. In some cases, the DUs and CUs described with reference to FIG. 3 may perform aspects of the functions for receiving an inactive request from a UE, transmitting an inactive acknowledgment to the UE, receiving a resume message from the UE, and transmitting a resume acknowledgment message to the UE.

Figure 4:
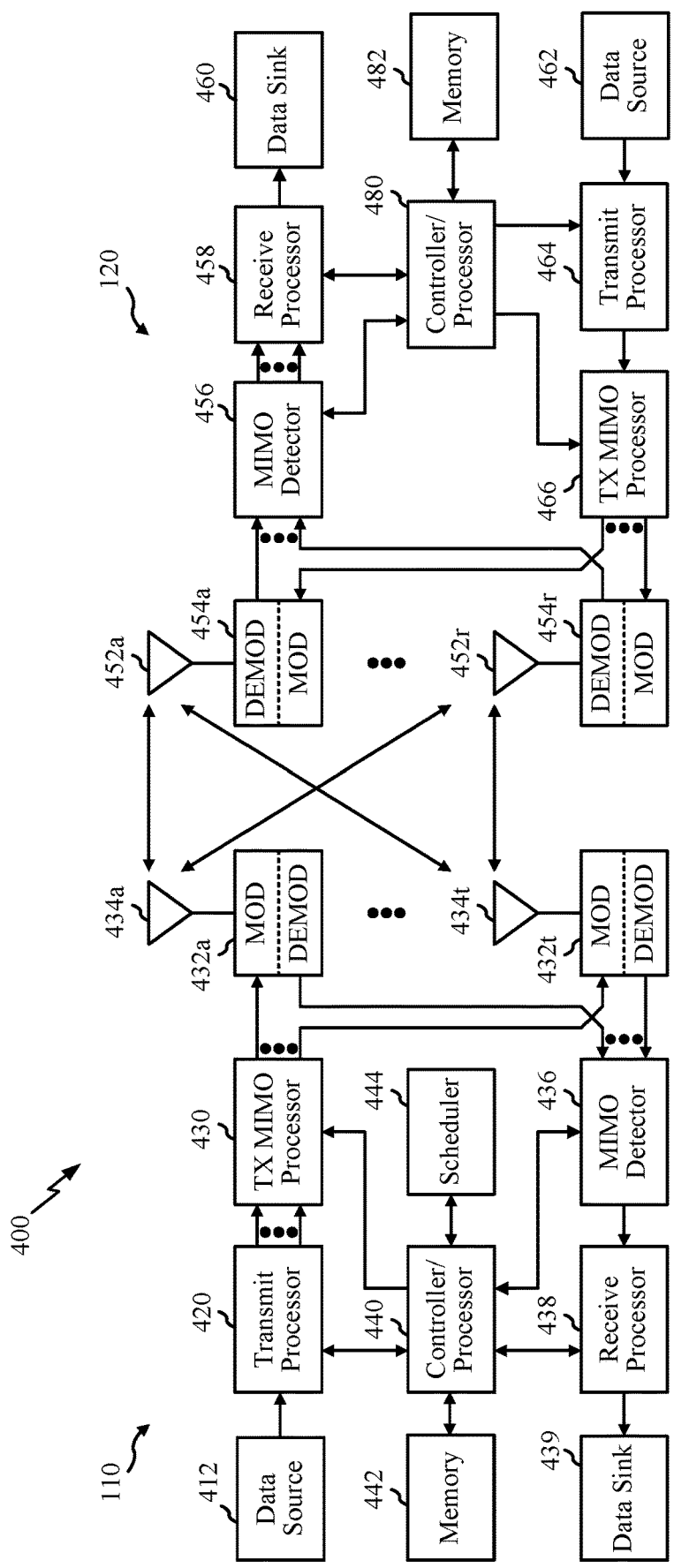
FIG. 4 is a block diagram illustrating a design of an example base station and user equipment (UE) in accordance with certain aspects of the present disclosure.

FIG. 4 illustrates example components of the base station 110 and UE 120 illustrated in FIG. 1, which may be used to implement aspects of the present disclosure. As described herein, the base station 110 may include a TRP. One or more components of the base station 110 and UE 120 may be used to perform aspects of the present disclosure. In one aspect, antennas 452, processors 466, 458, 464, and/or controller/processor 480 of the UE 120 and/or antennas 434, processors 430, 420, 438, and/or controller/processor 440 of the base station 110 may be used to perform the operations described herein. The base station 110 may be an example of a macro base station 110c, and the UE 120 may be an example of a UE 120y, described with respect to FIG. 1. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid Automatic Repeat Request (HARD) Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for a primary synchronization signal (PSS), secondary synchronization signal (SSS), and cell-specific reference signal. A transmit (Tx) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. In one aspect, the transmit (Tx) MIMO processor 430 may perform some aspects for reference signal multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, down convert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. According to one or more cases, coordinated multi-point (CoMP) aspects may include providing the antennas, as well as some Tx/receive (Rx) functionalities, such that they reside in distributed units. In one aspect, some Tx/Rx processing may be performed in the central unit, while other processing may be performed at the distributed units. In one aspect, in accordance with one or more aspects as shown in the diagram, the base station mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a Tx MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 (if applicable), and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the base station 110 and the UE 120, respectively. A scheduler 444 may schedule UEs for data transmission on the downlink and/or uplink.

As described herein, the base station 110 may communicate with one or more UEs 120, where a UE 120 may transmit an indication that the UE 120 is switching to a peer UE scheduling mode. Based on the indication that the UE 120 is switching to the peer UE scheduling mode, the base station 110 may ensure the UE 120 remains connected (e.g., in an RRC_CONNECTED mode) while the UE 120 operates in the peer UE scheduling mode. In some aspects, the peer UE scheduling mode may include another UE 120 (such as an RSU) scheduling sidelink resources for the UE 120, and the base station 110 may indicate, to the RSU, which resources are allocated for the sidelink communications.

Figure 5A:
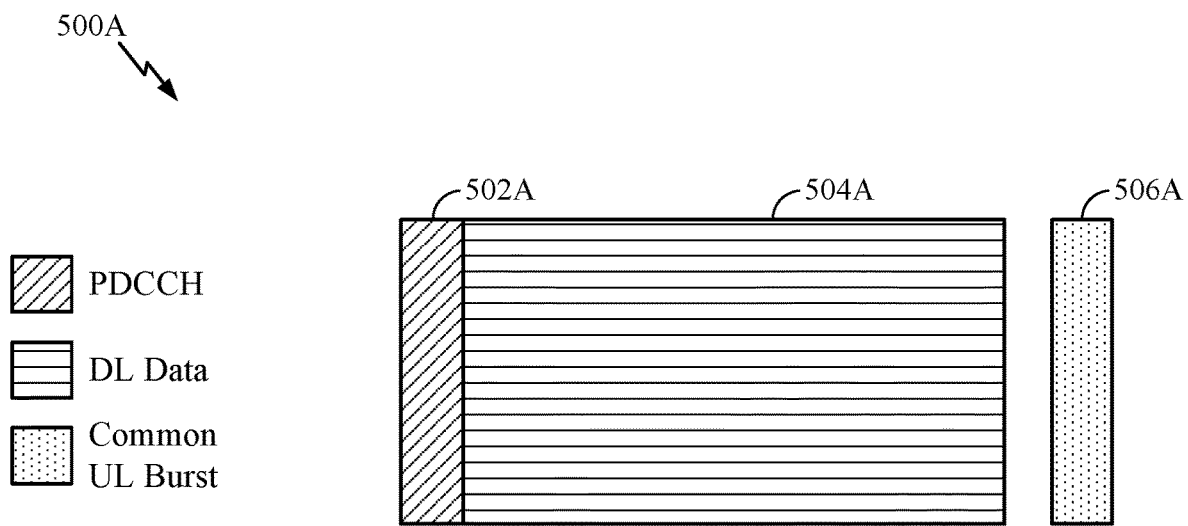
FIG. 5A is a diagram illustrating an example of a downlink (DL)-centric subframe according to some aspects of the present disclosure.

FIG. 5A is a diagram 500A illustrating an example of a DL-centric subframe according to some aspects of the present disclosure. The DL-centric subframe may include a control portion 502A. The control portion 502A may exist in an initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A.

The DL-centric subframe may also include a DL data portion 504A. The DL data portion 504A may sometimes be referred to as the payload of the DL-centric subframe. The DL data portion 504A may include the communication resources utilized to communicate DL data from a scheduling entity (e.g., eNB, base station, Node B, 5G NB, TRP, gNB, etc.) to the subordinate entity, e.g., UE 120. In some configurations, the DL data portion 504A may be a physical DL shared channel (PDSCH).

The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. In one aspect, the common UL portion 506 may include feedback information corresponding to the control portion 502A. Non-limiting examples of feedback information may include an acknowledgment (ACK) signal, a negative acknowledgment (NACK) signal, a HARQ indicator, and/or various other suitable types of information. The common UL portion 506A may include additional or alternative information, such as information pertaining to random access channel (RACH) procedures, scheduling requests (SRs), sounding reference signals (SRS), and various other suitable types of information.

As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity, e.g., UE 120) to UL communication (e.g., transmission by the subordinate entity e.g., UE 120). One of ordinary skill in the art will understand, however, that the foregoing is merely one aspect of a DL-centric subframe and alternative structures having similar features may exist without necessarily deviating from the aspects described herein.

Figure 5B:
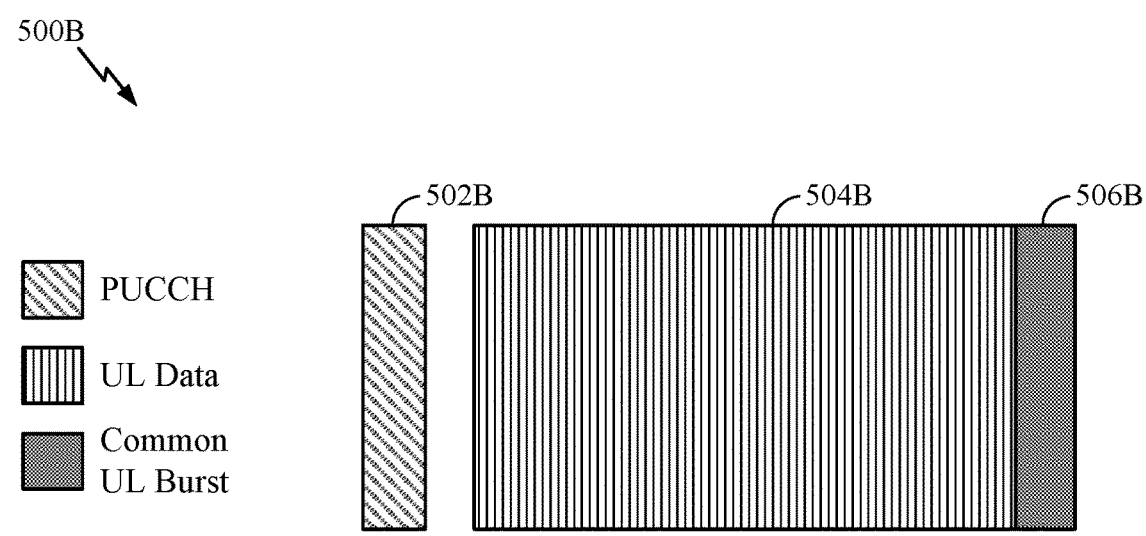
FIG. 5B is a diagram illustrating an example of an uplink (UL)-centric subframe according to some aspects of the present disclosure.

FIG. 5B is a diagram 500B illustrating an example of an UL-centric subframe according to some aspects of the present disclosure. The UL-centric subframe may include a control portion 502B. The control portion 502B may exist in an initial or beginning portion of the UL-centric subframe. The control portion 502B in FIG. 5B may be similar to the control portion 502A described above with reference to FIG. 5A. In some configurations, the control portion 502B may be a physical UL control channel (PUCCH), as indicated in FIG. 5A.

The UL-centric subframe may also include an UL data portion 504B. The UL data portion 504B may sometimes be referred to as the payload of the UL-centric subframe. The UL portion may refer to the communication resources utilized to communicate UL data from the subordinate entity, e.g., UE 120 to a scheduling entity (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity).

The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to a channel quality indicator (CQI), sounding reference signals (SRSs), and various other suitable types of information. One of ordinary skill in the art will understand that the foregoing is merely one aspect of an UL-centric subframe and alternative structures having similar features may exist without necessarily deviating from the aspects described herein.

In summary, an UL centric subframe may be used for transmitting UL data from one or more mobile stations to a base station, and a DL centric subframe may be used for transmitting DL data from the base station to the one or more mobile stations. In one aspect, a frame may include both UL centric subframes and DL centric subframes. In this aspect, the ratio of UL centric subframes to DL subframes in a frame may be dynamically adjusted based on the amount of UL data and the amount of DL data that are to be transmitted. In one aspect, if there is more UL data, then the ratio of UL centric subframes to DL subframes may be increased. Conversely, if there is more DL data, then the ratio of UL centric subframes to DL subframes may be decreased.

In some aspects, sidelink transmissions (e.g., for V2X communications) between UEs may utilize resources similar to the aspects described with reference to the DL-centric and UL-centric subframes. Sidelink communications may thus include the transmission of one or more control portions 502, one or more data portions 504, one or more common portions 506, or any combination thereof, between two or more devices on a sidelink communications link (e.g., using a PC5 interface). A UE may indicate a change from a base station scheduling mode to a peer UE scheduling mode (e.g., an RSU scheduling mode) by transmitting an indication using a control portion 502B or data portion 504B. Further, the UE may receive an indication of allocated sidelink resources using a DL control portion 502A or a DL data portion 504A, where the indication may be received from a base station, an RSU, or another UE.

V2X communication involves communication between vehicles (e.g., V2V), between vehicles and infrastructure (e.g., vehicle-to-infrastructure (V2I)), between vehicles and pedestrians (e.g., vehicle-to-pedestrian (V2P)), and between vehicles and network severs (vehicle-to-network (V2N)). For V2V, V2P, and V2I communications, data packets may be sent directly between vehicles or roadside units (RSU) without going through the network, eNB, or gNB. Existing V2X communication may utilize multiple operational modes. In one aspect, mode 3 is the network-scheduled resource allocation operation mode which may be a centralized mode (e.g., eNB based) in which the network schedules resources for a UE to use (e.g., per packet transmitted). With mode 3, network infrastructure is not involved in the data transmission. Although the base station may not carry data traffic in mode 3, the base station may control scheduling of resources. The UE may be connected to a network (e.g., in an RRC_CONNECTED mode) to transmit data. The UE requests transmission resources from the base station, and the base station may schedule transmission resources for transmission of sidelink control information and data. Sidelink semi-persistent scheduling (SPS) (e.g., where the scheduling of the traffic may be semi-persistent) may be supported for scheduled resource allocation. As a result, resources efficiency may be achieved, as the potential resource collisions may be avoided. Thus, for mode 3, the base station exchanges control signals with UEs, even though the base station does not transmit or receive data.

Another operational mode is mode 4, where the UE autonomously selects resources. With mode 4, the UE selects which resources to use from an allocated resource pool. The selection may be random or based on an algorithm. Such techniques may be known as an infrastructure-less mode of cellular V2X (C-V2X) operation. The UE may autonomously select resources from resource pools and perform transport format selection to transmit sidelink control information and data. If mapping between zones and V2X sidelink transmission resource pools is configured, the UE may select a V2X sidelink resource pool based on the zone UE is located in. In some aspects, the UE performs sensing for (re)selection of sidelink resources. Based on sensing results, the UE (re)selects some specific sidelink resources and reserves multiple sidelink resources. Up to two parallel independent resource reservation processes may be allowed to be performed by the UE. The UE is also allowed to perform a single resource selection for its V2X sidelink transmission. Another term for mode 4 may include UE autonomous resources selection mode.

In enhanced V2X (eV2X) operation (e.g., with an NR PC5 interface), an additional operation mode is possible that includes operation where another UE may schedule communications. In one aspect, a type of UE (e.g., an RSU), may be used to schedule other UEs in a vicinity using a PC5 interface directly. The RSUs may be authorized to manage resources for a group of UEs around the RSU using a peer UE scheduling mode or RSU scheduling mode. In this mode, the RSU may be allocated a group of resources, and the RSU may schedule UEs that are registered under the RSU over the PC5 interface to use the resources for the V2X communication. The RSU may obtain the group of resources from the network, e.g., an eNB or gNB, dynamically, or the RSU may be assigned with the group of resources based on a pre-configuration. In the peer UE scheduling mode or RSU scheduling mode, the UE obtains the resources allocation from the RSU using a PC5 interface, and may therefore not use Uu/RRC signaling with the network (e.g., eNB/gNB). The peer UE scheduling mode or RSU scheduling mode may also be referred to as Mode 3.5, where the network manages the resources allocation at a group level for all the UEs in a group.

Figure 6:
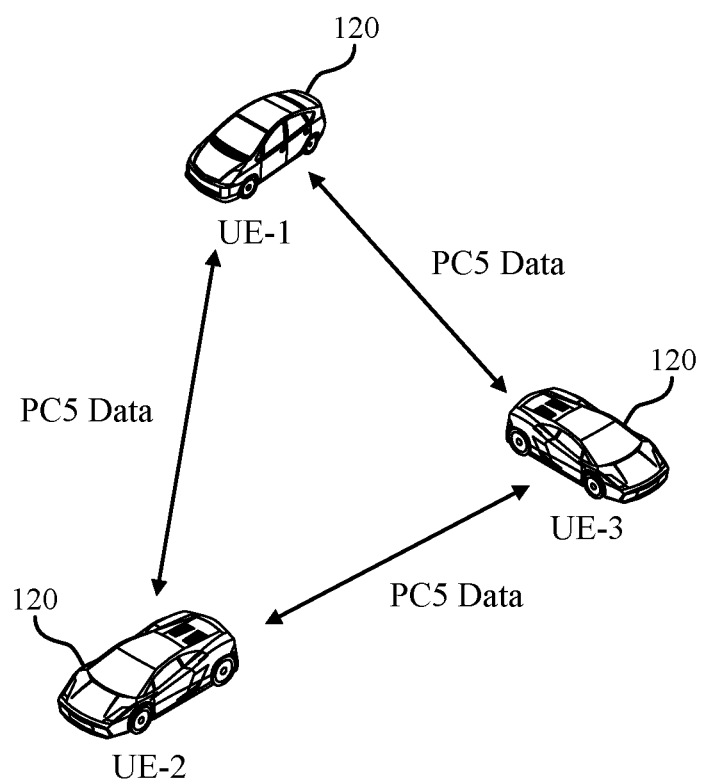
FIG. 6 illustrates UEs communicating among themselves using PC5 signaling.
Figure 7:
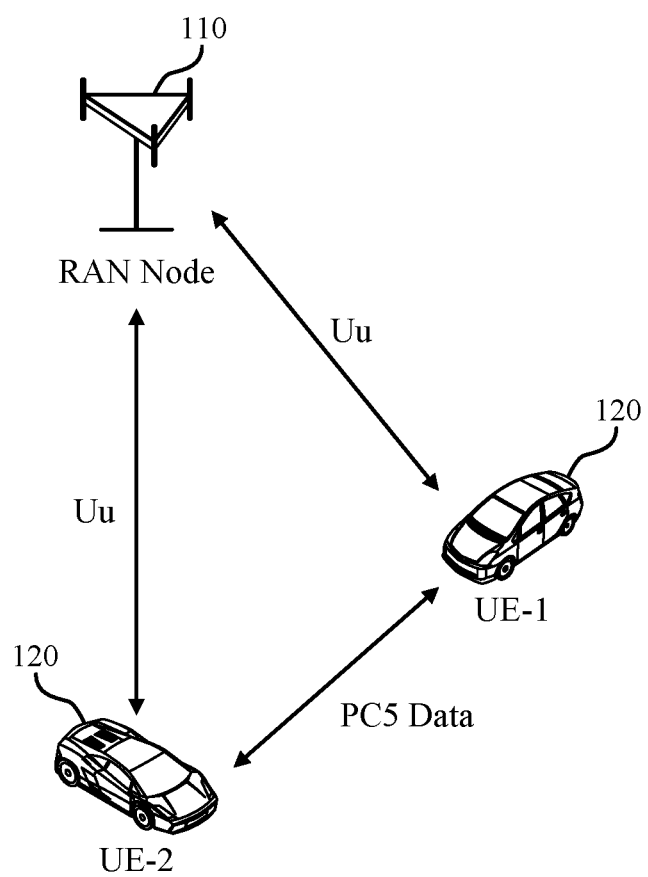
FIG. 7 illustrates UEs communicating among themselves using PC5 signaling and communicating with a RAN node using Uu interfaces.
Figure 8:
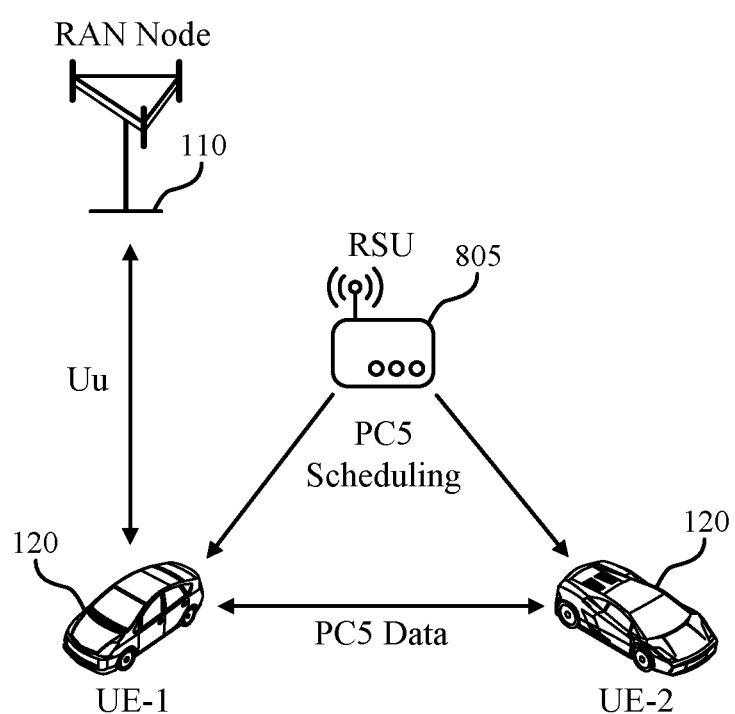
FIG. 8 illustrates UEs communicating among themselves using PC5 signaling, communicating with a RAN node using Uu interfaces, and communicating with an RSU using PC5 signaling.

The exact resource management for individual UEs is performed by the RSU or a leader of a platoon group using the PC5/sidelink communication channels. In one aspect of sidelink communications, FIG. 6 illustrates UEs 120 communicating among themselves using PC5 signaling, and FIG. 7 illustrates UEs 120 communicating among themselves using PC5 signaling and communicating with a RAN Node (e.g., a base station 110) using a Uu interface. FIG. 8 illustrates UEs 120 communicating among themselves using PC5 signaling, communicating with a RAN node (e.g., a base station 110) using Uu interfaces, and communicating with an RSU 805 using PC5 signaling. In any case, the Uu interface may be used by the RAN Node to communicate with the UEs, whereas PC5 may support direct communication between UEs 120 (e.g., for broadcast/multicast or groupcast/unicast).

In one aspect, a particular UE that operates in mode 3 for V2X communication receives scheduling signaling from the network, e.g., eNB/gNB, over the Uu interface. The RRC connection between the UE and the network, e.g., eNB/gNB, is in connected mode (e.g., RRC_CONNECTED). The UE may be in an RRC_CONNECTED mode even if the UE does not have an active packet data unit (PDU) session/packet data network (PDN) connection or any active data radio bearers (DRBs). However, when the UE transits to the peer UE scheduling mode, or RSU scheduling mode, or mode 3.5 described herein, the UE may obtain the resources allocation from the RSU via the PC5 interface. Therefore, there may be no need for any signaling exchange over the Uu interface between the UE and eNB/gNB. For instance, no RRC signaling, MAC signaling (e.g., a buffer status report (BSR)), or scheduling assignments would be triggered due to the V2X communication. This may lead to the Uu connection between the UE and the eNB/gNB timing out due to inactivity. In some aspects, the network may move the UE into an idle mode (e.g., RRC_IDLE) and may release the RRC connection. As such, if the UE was originally in mode 3, i.e., RRC_CONNECTED, with an eNB or a gNB over the Uu interface, and the UE transitions (or switches) from mode 3 towards the RSU scheduled mode, also referred to as mode 3.5, or peer UE scheduling mode, the UE may be moved into an idle mode. Such a situation may occur when, in the RSU scheduled mode (e.g., mode 3.5), the UE no longer communicates over the Uu link with the eNB to schedule resources.

Due to the inactivity, the eNB may move the UE into the RRC_IDLE mode and may delete all the UE contexts. This means that, when the UE switches back to mode 3 or when the UE does have data to send over Uu, the UE may have to reestablish an active connection with the network, i.e., exchanging signaling with the core network, establishing the context in the base station again, and potentially performing authentication/authorization procedures. Such procedures may cause delays and unnecessary core network signaling loads. Additionally, if there is downlink data, the network may waste limited paging resources to page the UE. Therefore, it may be undesirable to move the UE into an idle mode while communicating in a peer UE scheduling mode, as the UE may send/receive Uu data at any time in parallel with V2X communication, and/or may switch back to mode 3 due to leaving the coverage of RSU.

The present method and apparatus comprises defining explicit signaling between a UE and a RAN node (e.g., a base station, eNB, and/or gNB) to support switching between mode 3.5 (i.e., RSU scheduling mode or peer UE scheduling mode) and mode 3 for sidelink communications (e.g., eV2X NR PC5 operation). Specifically, the switching may be between mode 3, which uses Uu signaling from the RAN node, and mode 3.5 (i.e., RSU scheduling mode).

The present method and apparatus disclose using RRC or MAC signaling for informing a RAN node (or a base station, e.g., eNB/gNB) of a scheduling mode change. In one aspect, the UE sends a signaling message to the RAN node indicating that it will change from mode 3 to mode 3.5 (i.e., peer UE scheduling mode or RSU scheduling mode). This signaling message may be referred to as an inactive request message, a PC5 inactive request message, or other like terminology. Moreover, the signaling between the UE and base station may enable the base station to avoid moving the UE into an idle mode while communicating in the peer UE scheduling mode, and may further enable the base station to maintain a context/state of the UE. For instance, upon receipt of the inactive request message, the base station may refrain from timing out the Uu connection with the UE to maintain the context and/or state of the UE, and may avoid moving the UE into an RRC_IDLE mode while the UE is operating in the peer UE scheduling mode for sidelink communications.

FIG. 8 illustrates two automobiles, UE-1 and UE-2, exchanging data over a data interface (e.g., a PC5 data interface). UE-1 is also connected to a RAN node using a Uu interface. UE-1 and UE-2 also receive scheduling signals over a scheduling interface (e.g., a PC5 scheduling interface) from an RSU.

When the UE-1 is under RAN node (eNB/gNB) coverage and UE-1 selects mode 3 for PC5 scheduling, UE-1 may be in an RRC_CONNECTED mode over the Uu interface. The RAN node schedules the PC5 communications by sending signaling over the Uu interface.

When UE-1 is accepted by the RSU for scheduling, UE-1 signals to the RAN node to place PC5 interface-related operations over Uu (i.e., scheduling the sending and receiving of sidelink messages) into an inactive mode (e.g., a PC5_INACTIVE mode), where a PC5 mode 3 operation state-machine on the RAN node may be placed into an inactive mode when the RAN node receives an inactive request (e.g., a PC5 inactive request) from UE-1. UE-1 may then request the RSU to schedule the PC5 operations of UE-1, e.g., the communication with UE-2. However, this may not affect the operation of the Uu connection between the RAN node and UE-1 (e.g., for unicast communications).

UE-1 may decide to switch back to mode 3 (i.e., RRC_CONNECTED mode over Uu) at any point in time, or if ordered to do so by the RAN node. Switching back to mode 3 may be performed, in some aspects, by transmitting a resume message (e.g., a PC5 resume message) to the RAN node, and UE-1 may receive scheduling messages again (e.g., for PC5 operation) from the RAN node over the Uu interface.

An advantage of providing explicit signaling between UE-1 and the RAN node when switching scheduling nodes is that resources used for UEs may be planned for when switching. Another advantage is that the context/state of the UE is preserved such that the UE may switch back uninterrupted (e.g., no core network (CN) signaling is used) to allow for fast switching between the two modes. Thus, communications efficiency may be increased through the configuration of sidelink resources upon receipt of signaling from UE-1 that indicates that an operation mode is changing. Moreover, the uninterrupted switching between modes may enhance quality and reliability of services at UE-1.

Figure 9:
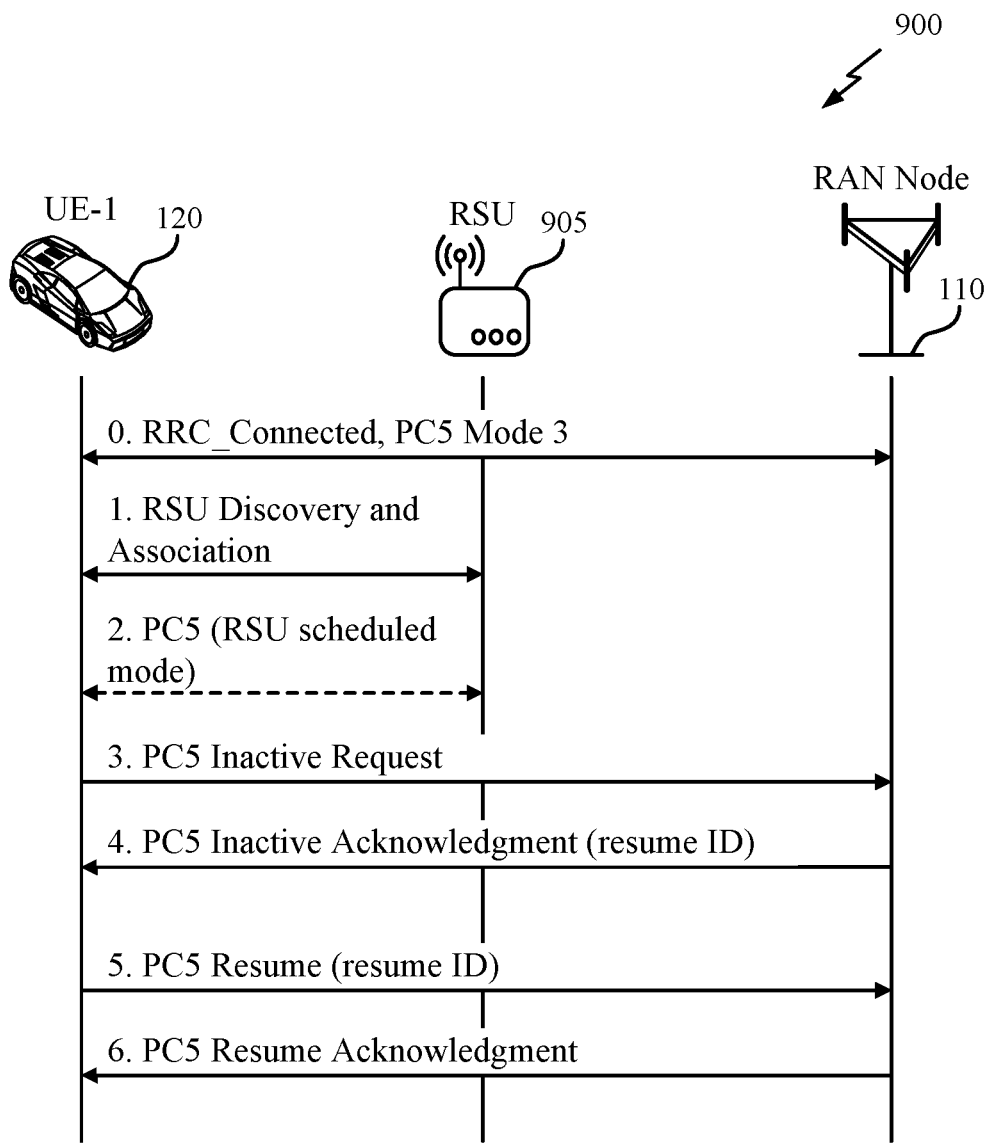
FIG. 9 provides details of signaling for a UE to switch between operation modes in accordance with certain aspects of the present disclosure.

FIG. 9 provides details of the signaling for the UE-1 to switch between the operation modes, in accordance with certain aspects of the present disclosure. For instance, FIG. 9 describes the signaling involved and the behavior of the entities.

As shown in FIG. 9, step 0, the UE-1 (e.g., a UE 120) may be operating in mode 3 for the PC5 communications, and therefore is in an RRC_CONNECTED state over a Uu interface with the RAN node (e.g., a base station 110). The UE-1 sends scheduling request (which may include a BSR), to the RAN nodes, and receives a scheduling grant, e.g., SA, from RAN node over the Uu interface.

At some point in time, e.g., at step 1, UE-1 comes under the coverage of a peer UE, e.g., an RSU 905. UE-1 may identify the peer UE, e.g., RSU, and the capability of the peer UE. This may be achieved with active polling for such UEs, or listening to the broadcast messages over a PC5 interface. UE-1 may additionally or alternatively be configured with information of the location of the peer UEs, e.g., RSUs, such that UE-1 knows, based on its location, that a RSU is in UE-1's proximity. UE-a may decide that it prefers to be scheduled by the RSU for sidelink (e.g., PC5) operation, e.g., as UE-a may be able to avoid activities on Uu and thus switch to a different RAT or for other reasons. UE-1 may try to obtain an association with the peer UE, e.g., RSU, such that UE-1 may use a scheduling service provided by the RSU (e.g., for sidelink communications).

To obtain the scheduling service from the peer UE, e.g., the RSU, UE-1 may first seek authorization from the peer UE. The authorization may be in the form of explicit signaling with the peer UE, or an implicit authorization by checking announcements from the peer UE. In case of the explicit signaling, UE-1 may send a registration request to the peer UE or RSU via the PC5 interface. The request may be in the form of an RRC message, a PC5 signaling message, an application layer signaling message, or any combination thereof. In one aspect, if the peer UE is a platoon lead, the signaling may be part of the platoon member management signaling. The registration request may include an identifier of UE-1 and allow the peer UE to use the identifier in subsequent resources scheduling management. The peer UE, e.g., the RSU, may send a registration acknowledgement message to the UE, where the registration is confirmed and the peer UE may use the identifier for UE-1 in resources scheduling control.

In case of implicit authorization, the peer UE, e.g., RSU, may periodically broadcast information for the UEs to know the existence of the peer UE and its capability of resources scheduling, e.g., Mode 3.5. From the broadcast information, UE-1 may also learn how to interact with the peer UE for the resources scheduling operation, e.g., whether to use MAC-CEs or RRC messages in setting up resources management. After this procedure, as identified by step 1 in FIG. 9, the UE-1 may start using the RSU's scheduling for its sidelink (e.g., PC5) operation, as in step 2 of FIG. 9.

UE-1 may send an inactive request message (e.g., a PC5 inactive request message) to the RAN node to inform the RAN node of switching between mode, as in step 3. The inactive request message includes an identifier for the peer UE (e.g., the RSU) that may provide the scheduling service for UE-1. In the authorization process, e.g., step 1 of FIG. 9, UE-1 may also learn the peer UE's (e.g., the RSUs) identifier that UE-1 will use in the inactive request message. The peer UE identifier may allow the RAN node (e.g., a base station), to authorize the change of operation modes of the UE when receiving the inactive request message. The RAN node may further determine the preferred operation, e.g., to change the resources allocation to the peer UE.

The RAN node determines that UE-1 is allowed to switch to the peer UE scheduling mode, i.e., mode 3.5, based on a variety of information, which may include the UE's subscription information, the identifier of the peer UE and whether the peer UE is allowed to perform mode 3.5 scheduling, the location of the UE, time of the day, radio conditions of the area, etc. If the UE is authorized to switch from mode 3 to the peer UE scheduling mode, i.e., mode 3.5, the RAN node may mark the UE's PC5 or sidelink operation state as inactive (e.g., PC5_INACTIVE) and store the corresponding information in the UE context. The RAN node may no longer schedule or reserve resources for the UE over the Uu interface for PC5 operation, e.g., releasing the SPS resources previously assigned to the UE, etc. However, the RAN node may store the identifiers allocated to the UE for the PC5 or sidelink operations. In some aspects, the stored identifiers may include one or more RNTIs for the sidelink, a UE-PC5 aggregate maximum bit rate (AMBR), authorization operation modes, or the like.

The inactive state (e.g., PC5 INACTIVE state) may affect the PC5 operation of the UE, but unicast transmissions over Uu interface may not be affected, i.e., the UE may still be in the RRC_CONNECTED state for unicast transmissions over Uu, and the DRBs may be maintained according to normal operation. The RAN node (i.e., base station) may transmit an inactive acknowledgment message (e.g., a PC5 inactive acknowledgment message) that includes a resume identifier (ID) and other information. This resume ID is allocated by the RAN node and used to index the UE's stored context information for the PC5 operation. When the UE switches back to the mode 3 operation, the resume ID may be used to retrieve the UE's stored context to help establish corresponding RRC states.

In addition, the RAN node may also adjust the configuration for the RSU if the RSU is under the RAN node's control. This includes, in some aspects, increasing or decreasing the resources allocated to the RSU/peer UE, transfer of UE-1's authorization information to the RSU for the scheduling use, and/or some security context, such that the RSU may be able to verify UE-1 for the authorization operations.

At some point in time, UE-1 may determine to switch back to mode 3 operation. For instance, UE-1 may be leaving the coverage of the RSU, the connection to the RSU is lost, or the like. UE-1 sends a resume message (e.g., a PC5 resume message) to the RAN node, and includes the resume ID that UE-1 received in the inactive acknowledgments message (e.g., the PC5 inactive acknowledgment message of step 4). The resume ID allows the RAN node to identify the stored context of UE-1 and validate the authenticity of the resume request. In one aspect, the resume ID may include some portion that is verifiable (e.g., cryptically verifiable) based on the security context of UE-1 that may be stored at the RAN node. If the verification is successful, the RAN node may resume the UE-1's scheduling operation for sidelink communications (e.g., PC5 operation, such as mode 3 PC5 operation), and the RAN node may send a resume acknowledgment message (e.g., a PC5 resume acknowledgment message) to confirm the mode switch to UE-1.

In another aspect, in step 4, the RAN node may provide an area ID (e.g., a PC5 RAN area ID) in the inactive acknowledgment message (e.g., the PC5 inactive acknowledgment message). The area ID may identify the area (e.g., a geographic area, cell, location, or the like) in which the mode 3.5 operation is authorized. The area ID may be in the form of some IDs announced by the RAN node (e.g., ECGIs, 5G cell IDs, tracking area IDs, registration area IDs, etc.). Alternatively, the area ID may also be a list of peer UE or RSU IDs. As such, if UE-1 moves into an area that is not covered by the area ID, UE-1 may perform the operation to resume sidelink communications scheduled by the RAN node (e.g., the PC5 resume operation, as in steps 5 and 6) and switch back to Mode 3 operation.

In another aspect, when UE-1 moves out of the area indicated by the area ID, and UE-1 has discovered and associated with a new peer UE or RSU, UE-1 may directly request for the authorization of an additional mode 3.5 operation by repeating step 3 and 4. In some aspects, when UE-1 goes from the coverage of a first RAN node to the coverage of a second RAN node, while remaining in the same platoon and being served by the same platoon leader, UE-1 may send an inactive request message (e.g., a PC5 inactive request message) to the second RAN node. In this inactive request message, UE-1 may further include the resume ID, or additionally the ID of the first RAN node. The second RAN node may then retrieve UE-1's context from the first RAN node using the resume ID and/or the first RAN node's ID. The second RAN node may further authorize UE-1's mode 3.5 operation in the coverage provided by the second RAN node.

Figure 10:
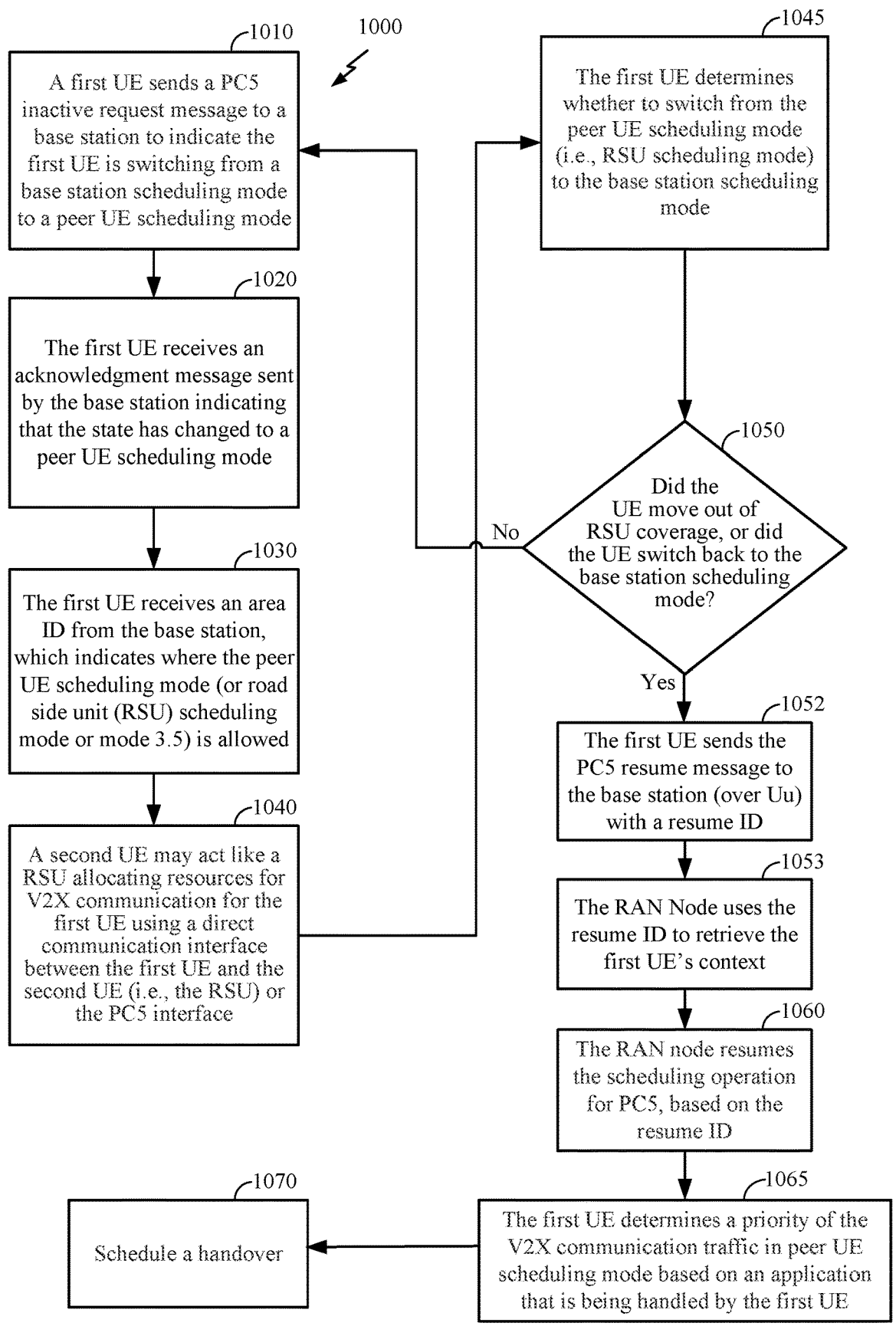
FIG. 10 is a flowchart disclosing a method for managing the operation mode of a UE in accordance with certain aspects of the present disclosure.

FIG. 10 is a flowchart disclosing a method for managing the operation mode of a first UE in V2X communication. In some aspects, FIG. 10 illustrates signaling for switching to/from a PC5 inactive mode, which may include the signaling for switching between mode 3 and mode 3.5 (i.e., peer UE scheduling mode or RSU scheduling mode), as described herein.

In step 1010, the first UE sends an inactive request message (e.g., a PC5 inactive request message) to a RAN node (i.e., a base station) to indicate the first UE is switching from a base station scheduling mode (i.e., RAN node scheduling mode or mode 3) to a peer UE scheduling mode, which may also be referred to as an RSU scheduling mode or mode 3.5. The inactive request message includes an identifier for a second UE (e.g., an RSU), where the second UE may schedule sidelink communications for the first UE.

In such cases, the first UE may use sidelink scheduling (e.g., PC5 scheduling modes) from the RSU, including mode 3.5, instead of using mode 3, which may use Uu signaling from the RAN node. The RSU scheduling mode for sidelink operations, however, may run in parallel with the UE receiving data over the Uu for unicast.

In step 1020, the first UE receives an acknowledgment message sent by the base station indicating a state change, where the indication indicates that the first UE's state (or operation mode) has changed to a peer UE scheduling mode or an RSU scheduling mode, i.e., mode 3.5. The signaling method used may include RRC signaling or MAC messages. In one aspect, the acknowledgement message includes a resume ID.

The base station (e.g., a RAN node) may keep the UE context for PC5 signaling (e.g., subscription information from the CN, allocated IDs, etc.). The base station may keep the context for the UE for sidelink (e.g., PC5) operation separately. However, the base station may remove the resources for scheduling sidelink operation over the Uu interface. Potentially, a RSU ID may be provided to the base station, which may allow the base station to perform some types of authorization of the RSU operation. In one aspect, the base station may perform at least one type of authorization of the peer UE scheduling mode based on the identifier of the second UE. In some cases, the base station may increase or decrease resources allocated to the second UE for peer UE scheduling mode operations by increasing or decreasing the RSU resources allocation block (which may include a pool of resources allocated for sidelink communications). In some cases, the base station may perform other types of authorization.

In step 1030, the first UE may receive an area ID from the base station which indicates where the peer UE scheduling mode (or RSU scheduling mode or mode 3.5) is allowed. The base station may further provide a list of IDs, e.g., a list of RSU IDs, that the peer UE scheduling mode is be allowed with. As such, a UE in this aspect knows the scheduling mode used in a location by checking the area IDs and/or the RSU IDs.

The area ID includes a list of identifiers, among which at least one of the identifiers is announced by the second UE (i.e., an RSU). The list includes RSUs (or second UEs) allowed for this operation by the UE. The base station may also provide a resume ID to the UE.

In step 1040, the second UE may act like an RSU allocating resources for the sidelink (e.g., V2X) communication for the first UE using the direct communication interface between the first UE and the second UE (i.e., the RSU) or the PC5 interface.

In another aspect, the first UE sends a signaling message to the base station that the first UE is switching from mode 3.5 (i.e., peer UE scheduling mode or RSU scheduling mode) to mode 3. This signaling message may include a resume message (e.g., a PC5 resume message). The resume message may be a signaling message from the first UE to the base station to inform the RAN node that the first UE is switching back to mode 3 operation for the sidelink (e.g., a PC5 link). Therefore, the base station resumes the state machine for the PC5 mode 3 operation.

In step 1045, the first UE may determine whether to switch from the peer UE scheduling mode (i.e., the RSU scheduling mode) to the base station scheduling mode. In some cases, the first UE the first UE may be within the area identified by the area ID when determining whether to switch back to the base station scheduling mode.

In step 1050, if the first UE moves out of the RSU coverage, or if the first UE determines to switch back to the base station scheduled mode, i.e., mode 3, (e.g., based on the determination at step 1045) then the first UE sends the resume message (e.g., the PC5 resume message) to the base station (over Uu) with the resume ID at step 1052. In cases where the first UE determines to switch back to the base station scheduled mode, i.e., mode 3, the first UE may do so, in some aspects, if the first UE determines it may move faster when scheduled by the RAN Node than by an RSU. Additionally, the base station scheduled mode area may be larger than the RSU scheduled mode area.

Thus, if the answer to step 1050 is yes (i.e., the UE has moved out of the RSU coverage or moves out of area where a PC5 inactive state may be allowed, or if the UE goes back to base station scheduled mode), then in step 1052 the UE sends the resume message to the base station (over Uu) with a resume ID. In step 1053, the base station uses the PC5 resume ID to retrieve the first UE's context. The resume ID may allow the base station to retrieve PC5 context for the first UE without using CN signaling.

In step 1060, the base station resumes the scheduling operation for sidelink communications, based on the resume ID. If this base station is different from the base station in step 1010, the base station obtains the first UE's context from the previous base station using the resume ID.

Additionally or alternatively, the first UE may move from the coverage of a first base station to the coverage of a second base station, while being served by the same RSU, UE-1 may send an inactive request message (e.g., a PC5 inactive request message) to the second base station. Thus, if the answer to step 1050 is no, the first UE may send an inactive request message to the second base station to indicate that the UE is operating in a peer UE scheduling mode (e.g., a RSU scheduling mode). In this inactive request message, the first UE may include the resume ID and/or the ID of the first base station.

In FIG. 10, after the base station receives the inactive request message (e.g., at step 1010), the base station may decide whether to allow the mode 3.5 (i.e., peer UE scheduling mode or RSU scheduling mode) based on a provided RSU ID. As described herein, an inactive request (e.g., a PC5 inactive request) transmitted by the UE requests that the scheduling mode be changed to mode 3.5. Whether the base station authorizes the switch to mode 3.5 may be based on the indicated RSU. In some cases, the UE may have both Uu and PC5 interfaces active at the same time, and the type of traffic the UE is handling may be used to determine which operation to prioritize. In one aspect, if the PC5 operation are for messages with high priority, e.g., high pro se per-packet priority (PPPP) or 5G quality of service (QoS) identifier (5QI) priority, the first UE may delay the operation of a transmission over the Uu interface even if such a transmission is scheduled by the base station and is conflicting with the PC5 transmission.

The base station may manage the Uu interface separately from PC5 communications. The base station may schedule the first UE for communications with the base station using a Uu interface, while the RSU has scheduled the first UE for PC5 operation at the same time which could result in conflicts. The base station may rely on the first UE to handle this conflict by prioritizing sidelink signaling for some traffic priorities. In one aspect, PC5 traffic may be prioritized based on an application that is being handled by the UE. The traffic packets for the application may be assigned a per package priority. The UE may also be configured with a priority threshold. If the application traffic for PC5 exceeds the priority threshold, the UE may prioritize the scheduling from the RSU in Mode 3.5 over the base station scheduling for the Uu transmission. In another aspect, such as at step 1065, the first UE determines a priority of the V2X communication traffic in peer UE scheduling mode based on an application that is being handled by the UE.

In some aspects, the UE's Uu connection to the RAN Node may no longer be needed (e.g., PDU session removed, or the Uu connection timed out due to inactivity because the UE may not be receiving data). In this case, the RAN node may provide another resume ID, and additional info to the UE. This other resume ID may be used together or separately with the PC5 resume ID, such that the first UE may indicate separately to the base station whether the first UE wants to resume just the PC5 scheduling operation (mode 3) or also the Uu operation (i.e., also resuming the DRBs).

In some aspects, the base station may create an area concept, where the first UE may freely switch between mode 3 and mode 3.5 within a particular area. This area may cover multiple cells, which may additionally be associated with multiple cell IDs. The area ID associated with the area may include an identifier announced by the base station. The area ID may be broadcast by the base station.

When the first UE goes outside of the RSU scheduling mode area (or peer UE scheduling mode area, or mode 3.5 area), or it lost connection with an RSU, the first UE may fall back to mode 3 by signaling (informing) the base station that the first UE is switching to mode 3. This may cause the first UE to signal to the base station using a PC5 resume message, as previously discussed regarding step 1052. When the first UE is within the RSU scheduling mode area, there may be an inter-RSU handover for the UE to allow the UE to switch between RSUs. Or, for mode 3.5, when a group leader is still present, the group may go over different cells in the area. Thus, when a UE goes outside of the RSU scheduling mode area, or the UE lost connection with any RSU, the UE may be scheduled to handover, as indicated by step 1070. In some aspects, the first UE may perform a handover from the second UE (e.g., an RSU) to a third UE (e.g., another RSU) to continue the peer UE scheduling mode. In another aspect, the first UE sends a PC5 inactive request message including the resume ID of the third UE to a base station. Additionally or alternatively, the first UE performs a handover from the base station to another base station, while maintaining a peer UE scheduling mode.

When the first UE moves out of the RSU scheduled mode area (or peer UE scheduling mode or mode 3.5), the first UE may indicate to the new base station (or RAN node) directly that it wants go to a peer UE scheduling mode (or RSU scheduling mode or mode 3.5) in the new area by signaling am inactive request (e.g., a PC5 inactive request) which requests the mode to be changed to RSU scheduling mode, or mode 3.5, without doing falling back to communicate with a base station using a Uu interface.

Figure 11:
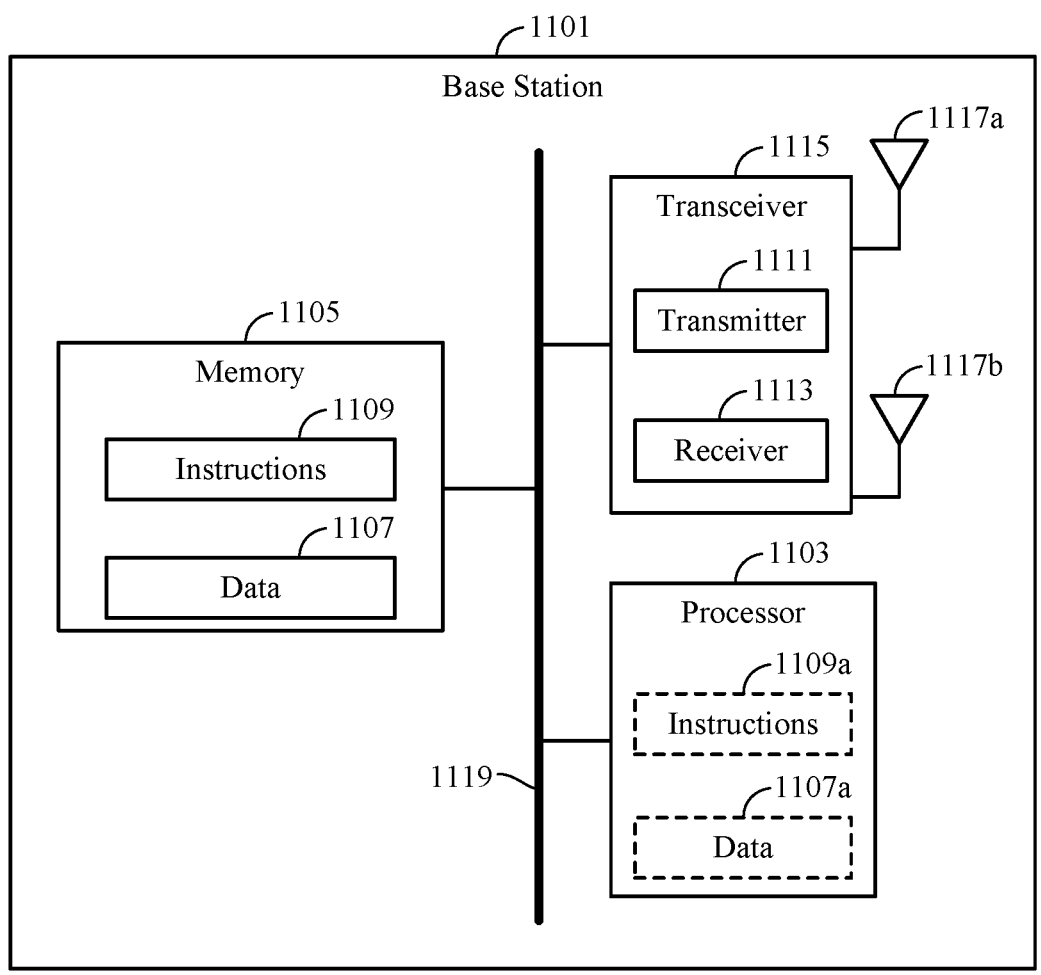
FIG. 11 illustrates components that may be included within a base station.

FIG. 11 illustrates components that may be included within a base station 1101. The base station 1101 may be an access point, a NodeB, an evolved NodeB, etc. The base station 1101 includes a processor 1103. The processor 1103 may be a general purpose single or multi-chip microprocessor (e.g., an advanced reduced instruction set computing (RISC) machine (ARM)), a special purpose microprocessor (e.g., a digital signal processor (DSP)), a microcontroller, a programmable gate array, etc. The processor 1103 may be referred to as a central processing unit (CPU). Although a single processor 1103 is shown in the base station 1101 of FIG. 11, in an alternative configuration, a combination of processors (e.g., an ARM and DSP) may be used.

The base station 1101 also includes memory 1105. The memory 1105 may be any electronic component capable of storing electronic information. The memory 1105 may be embodied as random-access memory (RAM), read-only memory (ROM), magnetic disk storage media, optical storage media, flash memory devices in RAM, on-board memory included with the processor, erasable programmable ROM (EPROM), electrically erasable programmable ROM (EEPROM), registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1101 may also include a transmitter 1111 and a receiver 1113 to allow transmission and reception of signals to and from the base station 1101. The transmitter 1111 and receiver 1113 may be collectively referred to as a transceiver 1115. Multiple antennas 1117a-b may be electrically coupled to the transceiver 1115. Although not shown, the base station 1101 may also include multiple transmitters, multiple receivers and/or multiple transceivers.

The various components of the base station 1101 may be coupled together by one or more buses, which may include a power bus, a control signal bus, a status signal bus, a data bus, etc. For the sake of clarity, the various buses are illustrated in FIG. 11 as a bus system 1119.

Figure 12:
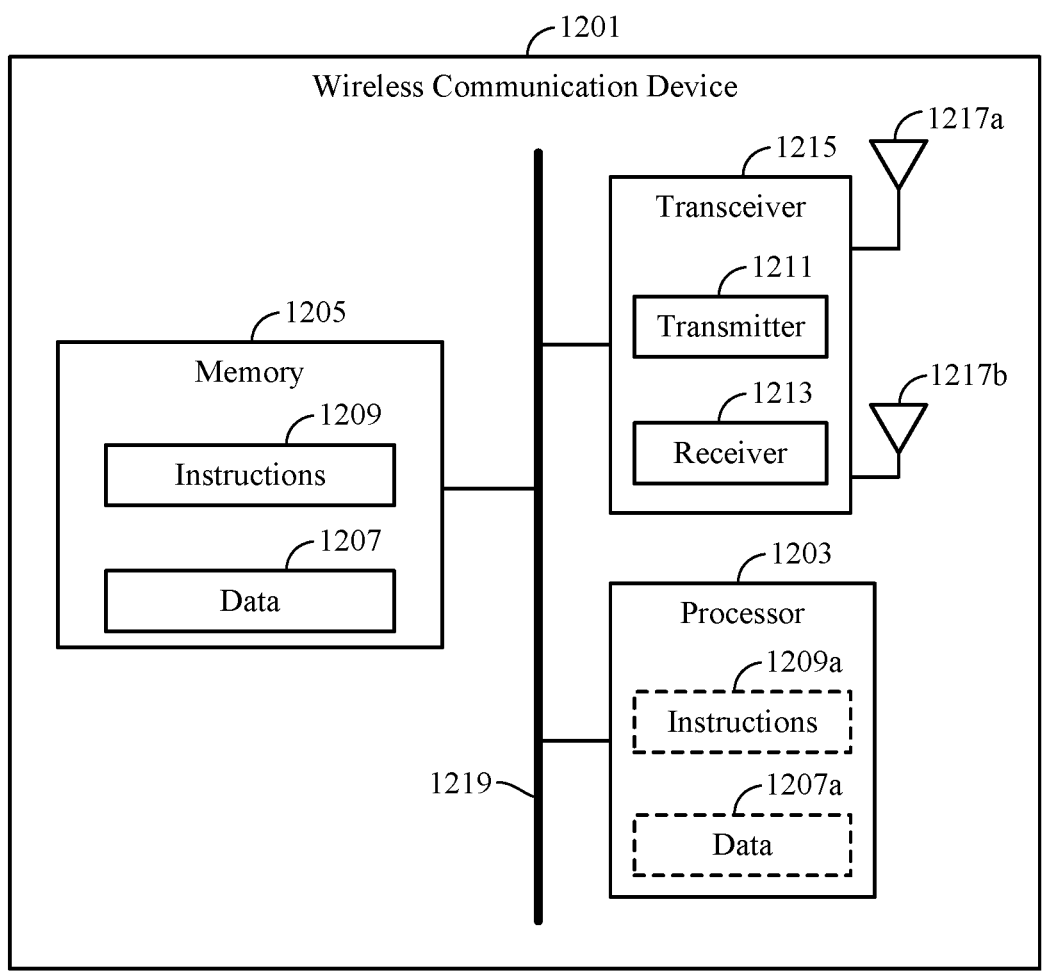
FIG. 12 illustrates components that may be included within a wireless communication device.

FIG. 12 illustrates components that may be included within a wireless communication device 1201. The wireless communication device 1201 may be an access terminal, a mobile station, a UE, etc. The wireless communication device 1201 includes a processor 1203. The processor 1203 may be a general-purpose single- or multi-chip microprocessor (e.g., an ARM), a special purpose microprocessor (e.g., a DSP), a microcontroller, a programmable gate array, etc. The processor 1203 may be referred to as a CPU. Although a single processor 1203 is shown in the wireless communication device 1201 of FIG. 12, in an alternative configuration, a combination of processors (e.g., an ARM and DSP) could be used.

The wireless communication device 1201 also includes memory 1205. The memory 1205 may be any electronic component capable of storing electronic information. The memory 1205 may be embodied as RAM, ROM, magnetic disk storage media, optical storage media, flash memory devices in RAM, on-board memory included with the processor, EPROM, EEPROM, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. Multiple antennas 1217a-b may be electrically coupled to the transceiver 1215. The wireless communication device 1201 may also include multiple transmitters, multiple receivers and/or multiple transceivers.

The various components of the wireless communication device 1201 may be coupled together by one or more buses, which may include a power bus, a control signal bus, a status signal bus, a data bus, etc. For the sake of clarity, the various buses are illustrated in FIG. 12 as a bus system 1219.

Using explicit signaling that indicates a change of an operational mode for sidelink or V2X communications, the processor 1203 of the wireless communication device 1201 (e.g., controlling the receiver 1213, the transmitter 1211, or the transceiver 1215) may efficiently be allocated resources for communicating with another device over a sidelink communication link. As such, when the wireless communication device 1201 performs sidelink communications, the processor may be ready to receive an allocation of sidelink resources (e.g., from an RSU) more efficiently through the reduction of a ramp up in processing power. Further, when the operational mode is switched to a peer UE scheduling mode, although the wireless communication device 1201 may not have data to communicate with a base station (e.g., via the Uu interface) for a duration of time, the context of the wireless communication device 1201 may be retained, and the connection of the wireless communication device 1201 may not be timed out (e.g., by a RAN node or base station). Thus, when the wireless communication device 1201 communicates with the base station, additional signaling may be avoided (e.g., to reestablish the connection), thereby reducing processing overhead by the processor 1203 and reducing signaling by the transceiver 1215, receiver 1212, or transmitter 1211.

It should be noted that the methods described herein describe possible implementation, and that the operations and the steps may be rearranged or otherwise modified such that other implementations are possible. In some aspects, features from two or more of the methods may be combined. In one aspect, aspects of each of the methods may include steps or aspects of the other methods, or other steps or techniques described herein. Thus, aspects of the disclosure may provide for switching operational modes for sidelink communications.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (such as a list of items prefaced by a phrase such as "at least one of" or "one or more") indicates an inclusive list such that, in some aspects, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media can include RAM, ROM, EEPROM, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. In one aspect, each eNB or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNB, gNB, home NodeB, a home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, in one aspects, the wireless network 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for managing the operation mode of one or more UEs in D2D or V2X communication. It should be noted that these methods describe possible implementations, and that the operations and the steps may be rearranged or otherwise modified such that other implementations are possible.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various aspects, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for managing an operation mode implemented by a first user equipment (UE) in device-to-device communication, comprising:
    transmitting, by the first UE, a request message to a base station to indicate the first UE is switching from a base station scheduling mode to a peer UE scheduling mode;
    receiving, by the first UE, an acknowledgment message from the base station indicating a state change to allow the peer UE scheduling mode, wherein the acknowledgement message includes a resume identifier for resuming the base station scheduling mode; and
    maintaining a connection state with the base station while in the peer UE scheduling mode based at least in part on the acknowledgment message.

2. The method according to claim 1, further comprising:
    receiving, by the first UE from a second UE, an allocation of resources for the device-to-device communication for the first UE, wherein the resources are allocated using a direct communication interface between the first UE and the second UE, a sidelink interface between the first UE and the second UE, or any combination thereof.

3. The method according to claim 2, further comprising:
    performing, by the first UE, a handover from the second UE to a third UE to continue the peer UE scheduling mode.

4. The method according to claim 3, wherein the handover comprises:
    sending, by the first UE, another request message to the base station including an identifier of the third UE to the base station.

5. The method according to claim 2, wherein the second UE comprises a roadside unit (RSU).

6. The method according to claim 1, further comprising:
    determining, by the first UE, that the first UE is within an area identified by an area identifier; and
    transmitting, by the first UE, a resume message to the base station to indicate the first UE is switching from the peer UE scheduling mode to the base station scheduling mode.

7. The method according to claim 6, wherein the area identifier includes a list of identifiers, among which at least one identifier of the list of identifiers is announced by a second UE allocating resources for the device-to-device communication for the first UE.

8. The method according to claim 6, wherein the area identifier includes an identifier announced by the base station.

9. The method according to claim 6, wherein the resume message includes the resume identifier.

10. The method according to claim 1, further comprising:
    receiving, by the first UE, an area identifier from the base station, the area identifier indicating an area in which the peer UE scheduling mode is allowed.

11. The method according to claim 1, further comprising:
    performing, by the first UE, a handover from the base station to another base station; and
    maintaining, by the first UE, the peer UE scheduling mode.

12. The method according to claim 1, further comprising:
    determining, by the first UE, a priority of device-to-device communication traffic in the peer UE scheduling mode based on an application that is being handled by the first UE.

13. The method according to claim 1, wherein the resume identifier comprises an index for the first UE's stored context information.

14. The method according to claim 1, wherein the request message is a radio resource control message or a medium access control message.

15. The method according to claim 1, wherein the device-to-device communication comprises vehicle-to-everything (V2X) communication.

16. A first user equipment (UE) to manage an operation mode of the first UE in device-to-device communication, comprising:
    a processor;
    memory coupled with the processor, the processor configured to
    transmit a request message to a base station to indicate the first UE is switching from a base station scheduling mode to a peer UE scheduling mode; and
    receive an acknowledgment message from the base station indicating a state change to allow the peer UE scheduling mode, wherein the acknowledgement message includes a resume identifier for resuming the base station scheduling mode; and
    maintain a connection state with the base station while in the peer UE scheduling mode based at least in part on the acknowledgment message.

17. The first UE according to claim 16, wherein the peer UE scheduling mode comprises:
    a second UE allocating resources for the device-to-device communication for the first UE, wherein the resources are allocated using a direct communication interface between the first UE and second UE, or a sidelink interface between the first UE and the second UE, or any combination thereof.

18. The first UE according to claim 17, wherein the processor is further configured to:
    perform a handover from the second UE to a third UE to continue the peer UE scheduling mode.

19. The first UE according to claim 17, wherein the request message includes an identifier for the second UE.

20. The first UE according to claim 16, wherein the processor is further configured to:
   determine that the first UE is within an area identified by an area identifier; and
   transmit a resume message to the base station to indicate the first UE is switching from the peer UE scheduling mode to the base station scheduling mode.

21. The first UE according to claim 20, wherein the area identifier includes an identifier announced by the base station.

22. The first UE according to claim 16, wherein the processor is further configured to:
   perform a handover from the base station to another base station; and
   maintain the peer UE scheduling mode.

23. The first UE according to claim 16, wherein the processor is further configured to:
   determine a priority of device-to-device communication traffic in the peer UE scheduling mode based on an application that is being handled by the first UE.

24. The first UE according to claim 16, wherein the resume identifier comprises an index for the first UE's stored context information.

25. The first UE according to claim 16, further comprising receiving an area identifier from the base station, the area identifier indicating an area in which the peer UE scheduling mode is allowed.

26. An apparatus for managing an operation mode of a user equipment (UE) in device-to-device communication, comprising:
   means for sending a request message to a base station to indicate the UE is switching from a base station scheduling mode to a peer UE scheduling mode;
   means for receiving an acknowledgment message from the base station indicating a state change to allow the peer UE scheduling mode, wherein the acknowledgement message includes a resume identifier for resuming the base station scheduling mode; and
   means for receiving an area identifier from the base station, the area identifier indicating an area in which the peer UE scheduling mode is allowed; and
   means for maintaining a connection state with the base station while in the peer UE scheduling mode based at least in part on the acknowledgment message.

27. A method for managing an operation mode of a first user equipment (UE) in device-to-device communication implemented by a base station, comprising:
   receiving, by the base station, a request message from the first UE to indicate the first UE is switching from a base station scheduling mode to a peer UE scheduling mode;
   transmitting, by the base station, an acknowledgment message to the first UE indicating a state change to allow the peer UE scheduling mode, wherein the acknowledgement message includes a resume identifier for resuming the base station scheduling mode; and
   maintaining, by the base station, a connection state of the first UE while the first UE is in the peer UE scheduling mode based at least in part on the received request message.

28. The method according to claim 27, further comprising:
   performing, by the base station, at least one type of authorization of the peer UE scheduling mode based on an identifier for a second UE.

29. The method according to claim 28, wherein performing the at least one type of authorization comprises:
   increasing or decreasing, by the base station, resources allocated to the second UE for peer UE scheduling mode operation.

30. The method according to claim 28, wherein the request message includes the identifier for the second UE.

* * * * *